US009352937B2

(12) United States Patent
Nakagaki et al.

(10) Patent No.: US 9,352,937 B2
(45) Date of Patent: May 31, 2016

(54) ESCALATOR STEP AND ESCALATOR HAVING THEREOF

(71) Applicant: TOSHIBA ELEVATOR KABUSHIKI KAISHA, Kawasaki-shi, Kanagawa (JP)

(72) Inventors: Shigeo Nakagaki, Saitama (JP); Kosei Kamimura, Tokyo (JP); Yoshinobu Ishikawa, Tokyo (JP); Hideo Takahashi, Kanagawa (JP); Takayuki Kikuchi, Hyogo (JP); Satoshi Yamaguchi, Hyogo (JP)

(73) Assignee: TOSHIBA ELEVATOR KABUSHIKI KAISHA, Kawasaki-Shi (JP)

( * ) Notice: Subject to any disclaimer, the term of this patent is extended or adjusted under 35 U.S.C. 154(b) by 13 days.

(21) Appl. No.: 14/467,745

(22) Filed: Aug. 25, 2014

(65) Prior Publication Data

US 2015/0136563 A1 May 21, 2015

(30) Foreign Application Priority Data

Aug. 29, 2013 (JP) ................................. 2013-178422

(51) Int. Cl.
*B65G 23/12* (2006.01)
*B66B 23/12* (2006.01)

(52) U.S. Cl.
CPC ..................................... *B66B 23/12* (2013.01)

(58) Field of Classification Search
None
See application file for complete search history.

(56) References Cited

U.S. PATENT DOCUMENTS 2,210,711 A 8/1940 Dunlop
4,413,719 A * 11/1983 White ..................... B66B 23/14 198/333
4,984,672 A * 1/1991 Saito ....................... B66B 23/12 198/333
4,984,673 A * 1/1991 Saito ...................... B21D 13/10 198/333
5,337,879 A 8/1994 Fischer
6,610,382 B1 * 8/2003 Kobe ..................... A63B 49/08 128/849
6,978,876 B1 12/2005 Tsukahara et al.
7,559,673 B2 7/2009 Meersman et al.
2007/0165162 A1 7/2007 Meersman et al.

FOREIGN PATENT DOCUMENTS

CN 201458495 U 5/2010
JP 04-077582 U 7/1992
JP H04 77582 U 7/1992

(Continued)

OTHER PUBLICATIONS

Harper, Charles A., Handbook of Plastics, Elastomers, and Composites, *McGraw Hill*, 2002, section 3.4.

(Continued)

*Primary Examiner* — Kavel Singh
(74) *Attorney, Agent, or Firm* — Foley & Lardner LLP

(57) ABSTRACT

An escalator step includes a tread having a body section on which a plurality of convex sections are arranged in parallel, a riser connected to a rear end portion of the tread and having thereon a plurality of convex sections and a plurality of concave sections formed between the adjacent convex sections, and a shock absorbing cleat provided on a corner at which the riser and tread are connected to each other. The shock absorbing cleat includes a plurality of long convex sections which are arranged in parallel and a plurality of short convex sections which are arranged in parallel between the adjacent long convex sections. The shock absorbing cleat is formed of a polymeric material having a Young's modulus of 1000 MPa or less.

11 Claims, 20 Drawing Sheets

(56) References Cited

FOREIGN PATENT DOCUMENTS

| | | | |
|---|---|---|---|
| JP | 2001-089057 | A | 4/2001 |
| JP | 2004-044176 | A | 2/2004 |
| JP | 2007-188085 | A | 7/2007 |
| JP | 2009 196737 | A | 9/2009 |
| JP | 2009-203793 | A | 9/2009 |
| JP | 2010 006493 | A | 1/2010 |
| JP | 2013-124183 | A | 6/2013 |
| WO | WO 01/17888 | A1 | 3/2001 |

OTHER PUBLICATIONS

Safety Rules for the Constuction and Installation of Escalators and Moving Walks, GB16899-2011, Jul. 29, 2011.

* cited by examiner

A-A cross section

B-B cross section

C-C cross section

ESCALATOR STEP AND ESCALATOR HAVING THEREOF

CROSS-REFERENCE TO RELATED APPLICATION

This application is based upon and claims the benefit of priority from the prior Japanese Patent Application No. 2013-178422 filed on Aug. 29, 2013, the entire contents of which are incorporated herein by reference.

TECHNICAL FIELD

The present invention relates to an escalator step and an escalator having thereof.

BACKGROUND

There are many accidents such that a passenger falls down on an escalator. Particularly, collision of a body, especially, a head with a corner where the tread and the riser of a step intersect may cause a major injury. Therefore, there is need for a safe escalator to absorb collision energy generated when a passenger falls down and hits his or her head against the corner, thereby avoiding a serious injury. While the escalator prevents the passenger from suffering a serious injury when he or she falls down, it should not have a structure that encourages the passenger to fall down in a normal use state.

As a means for preventing the passenger from suffering a serious injury when his or her body collides with the corner, an escalator step in which a cleat strip made of a flexible polymeric material is mounted on a tread part corresponding to the corner is proposed (Patent Document 1: Jpn. Pat. Appln. Laid-Open Publication No. 04-77582). That is, Patent Document 1 discloses that by mounting a cleat strip made of a flexible polymeric material on a tread part corresponding to the corner, the degree of an injury can be reduced even if a passenger falls down on a step and hits his or her body against the corner of the step.

However, Patent Document 1 discloses that a cleat strip made of a flexible polymeric material is mounted on a tread part corresponding to the corner of the step of the escalator but does not concretely describe the type and hardness of a material of the cleat strip to be used for preventing an injury of the passenger when he or she falls down. Thus, in the escalator step described in Patent Document 1, it is difficult to reliably prevent an injury of the passenger, particularly, a serious head injury when he or she falls down.

As described above, the escalator step is required to absorb collision energy generated when the passenger falls down and hits his or her head, which is the most important part of the human body, against the corner, so as to avoid a serious injury. At the same time, the escalator step should not have such a flexible structure that encourages the passenger to fall down in a normal use state. That is, the cleat needs to have enough hardness so as not to be buckled by a load applied thereto when the passenger stands on the cleat or walk on the cleat.

SUMMARY

The present invention has been made to solve the above problem, and an object thereof is to provide a safe escalator step that can reliably prevent a passenger from suffering a serious injury even when he or she falls down and hits his or her head against a step corner and that does not encourage falling of the passenger even in a normal use state by selecting a material of a shock absorbing cleat provided at the corner of the escalator step and material characteristics thereof.

An escalator step according to an embodiment includes: a tread formed on the escalator step in a parallel of the escalator traveling direction; a riser connected to a rear end portion of a body section of the tread and having thereon a plurality of convex sections arranged in a width direction perpendicular to a traveling direction of the escalator and a plurality of concave sections formed between the adjacent convex sections; and a shock absorbing cleat provided in a notch formed at the body section rear end portion near a corner at which the riser and tread are connected to each other. The shock absorbing cleat includes a plurality of convex sections which are arranged in parallel with the convex sections of the body section and each of which has a front end surface forming a flat surface with the convex section of the body section. The shock absorbing cleat is formed of a polymeric material having a Young's modulus of 1000 MPa or less.

According to the present invention, it is possible to provide, at low cost, a safe escalator that can reliably prevent the passenger from suffering a serious injury even when he or she falls down and hits his or her head against a step corner and that does not encourage falling of the passenger even in a normal use state by a molding of a polymeric material.

DETAILED DESCRIPTION

An embodiment of an escalator step will be described in detail below with reference to the drawings.

An escalator step according to the present embodiment includes: a tread having a body section on which a plurality of convex sections are arranged in parallel in a width direction thereof; a riser connected to one end portion of the body section of the tread and having thereon a plurality of convex sections arranged in a width direction thereof and a plurality of concave sections formed between the adjacent convex sections; and a shock absorbing cleat provided in a notch formed at a corner at which the riser and tread are connected to each other. The shock absorbing cleat includes a plurality of convex sections which are arranged in parallel with the convex sections of the body section and each of which has a front end surface forming a flat surface with the convex section of the body section. The shock absorbing cleat is formed of a polymeric material having a Young's modulus of 1000 MPa or less.

First Embodiment

A configuration of a first embodiment will be described with reference to FIGS. 1 to 9.

Figure 1:
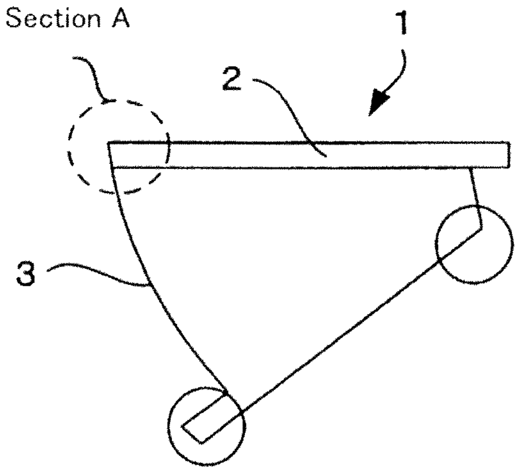
FIG. 1 is a side view illustrating an escalator step.

FIG. 1 is a side view of a step 1 of an escalator. The step 1 has a tread 2 at a top thereof, on which a passenger rides to go up or down. The following description will be made by defining a travelling direction (right-hand side in FIG. 1) as a front side when the step 1 of FIG. 1 goes up, and defining the opposite direction (left-hand side in FIG. 1) as a back side. A riser 3 is provided at a rear end of the step 1. A top of the riser 3 intersects a rear end of the tread 2 to form a corner (section A of the drawing).

Figure 2:
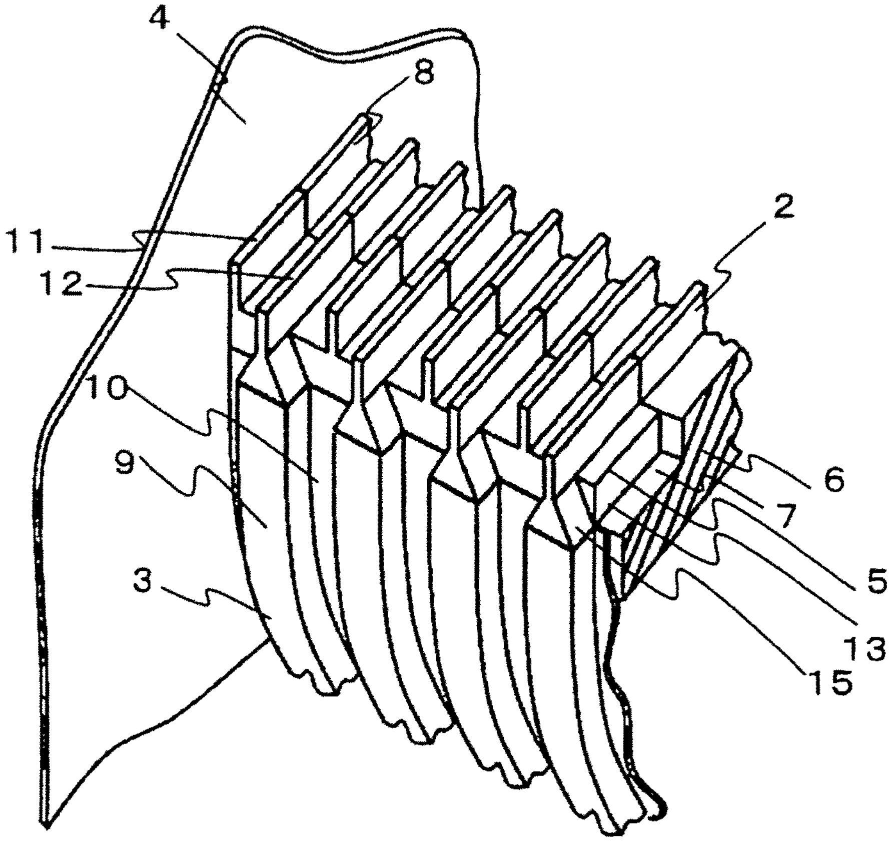
FIG. 2 is a partially cut perspective view partially illustrating a vicinity of a corner of the escalator step.
Figure 3:
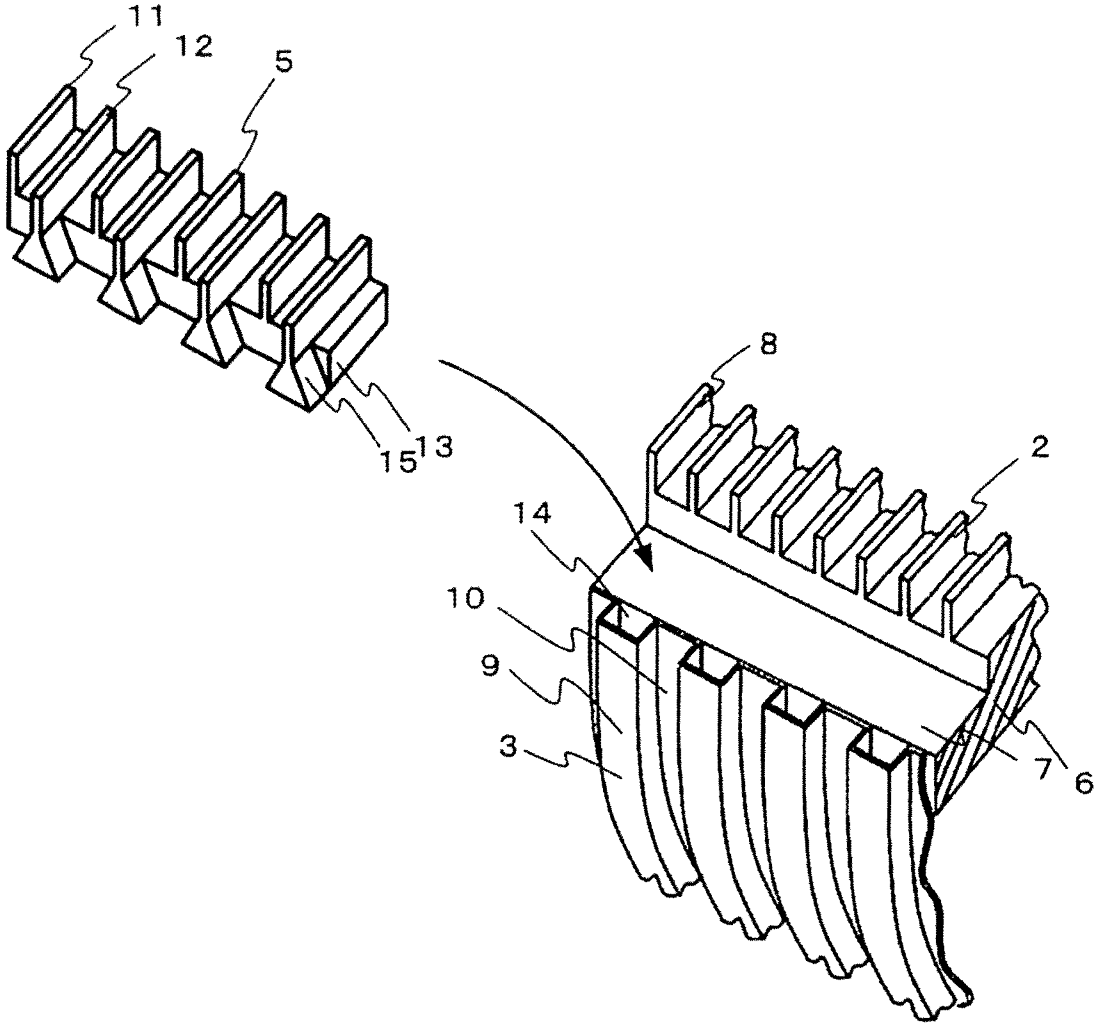
FIG. 3 is a partially cut exploded perspective view illustrating the vicinity of the corner of the escalator step.

FIG. 2 and FIG. 3 are partial perspective views illustrating a state in which the corner (section A of FIG. 1) is seen from the vicinity of a center of the step 1 toward a skirt guard 4. FIG. 2 illustrates a state in which a shock absorbing cleat 5 is mounted on a body section 6 of the tread 2. FIG. 3 illustrates a state before the shock absorbing cleat 5 is mounted thereon.

The riser 3 is connected to a rear end of the body section 6 of the tread 2. A notch 7 is provided at an upper surface side of the rear end of the body section 6. A plurality of convex sections 8 of the body section 6 are provided at equal intervals on the upper surface of the body section 6.

At the riser 3, a plurality of convex sections 9 and concave sections 10 are alternately provided at equal intervals by bending a board. It should be noted that metallic materials, such as aluminum and stainless steel, are used for the body section 6 of the tread 2 and for the riser 3.

In the shock absorbing cleat 5, short convex sections 11, each having a rear end surface being the same flat surface as a concave section 10 of the riser 3, and long convex sections 12, each having a rear end surface projecting so as to be the same flat surface as a convex section 9 of the riser, are provided alternately on an upper surface of a base section 13, at equal intervals. Each front end surface of the short convex sections 11 and the long convex sections 12 is configured to be coupled with each rear end surface of the convex sections 8 of the body section 6 of the tread 2. A base section 13 is provided at bottoms of the short convex sections 11 and the long convex sections 12. The base section 13 at each bottom of the long convex sections 12 is provided with a protruding section 15 which plugs a hole 14 of each convex section 9 of the riser 3.

Although only one shock absorbing cleat 5 is illustrated in FIG. 2 and FIG. 3, a plurality of the same shock absorbing cleats are practically arranged in a width direction of the step 1.

Figure 4:
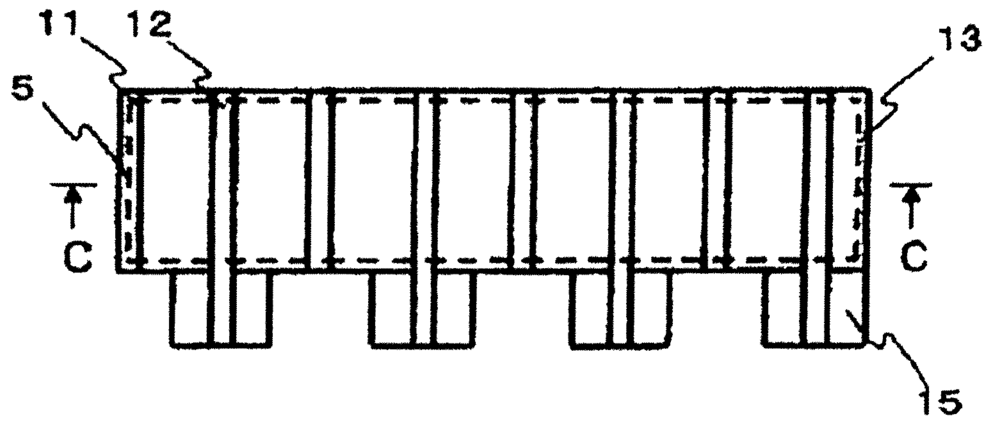
FIG. 4 is a top view of a shock absorbing cleat.
Figure 5:
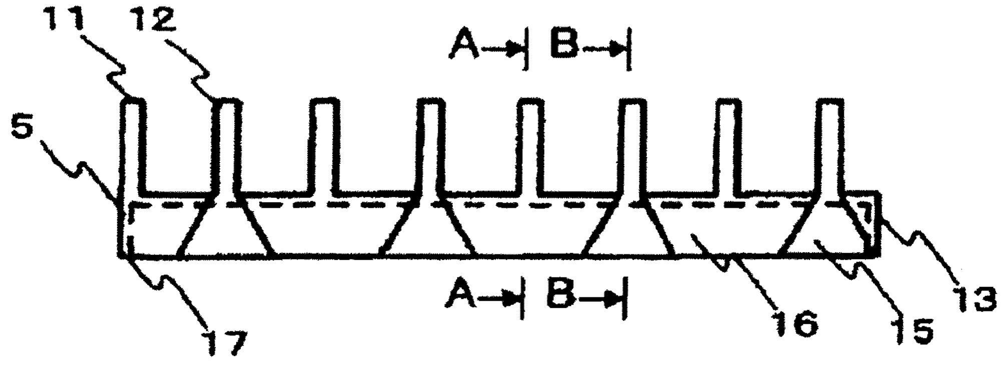
FIG. 5 is a front view of the shock absorbing cleat.
Figure 6:
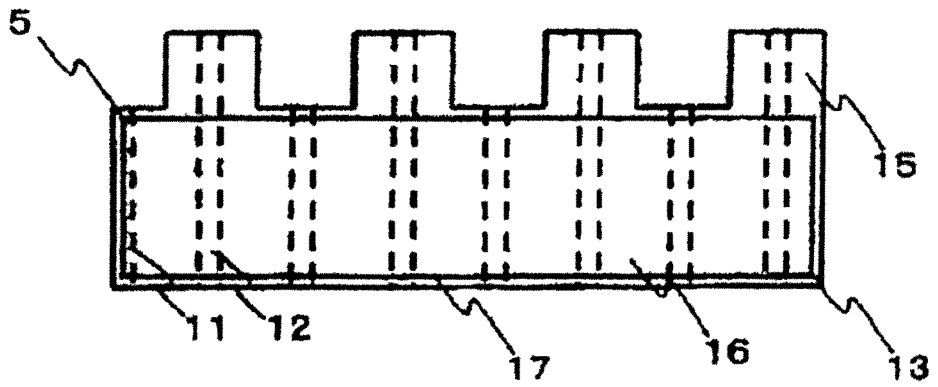
FIG. 6 is a bottom view of the shock absorbing cleat.
Figure 7:
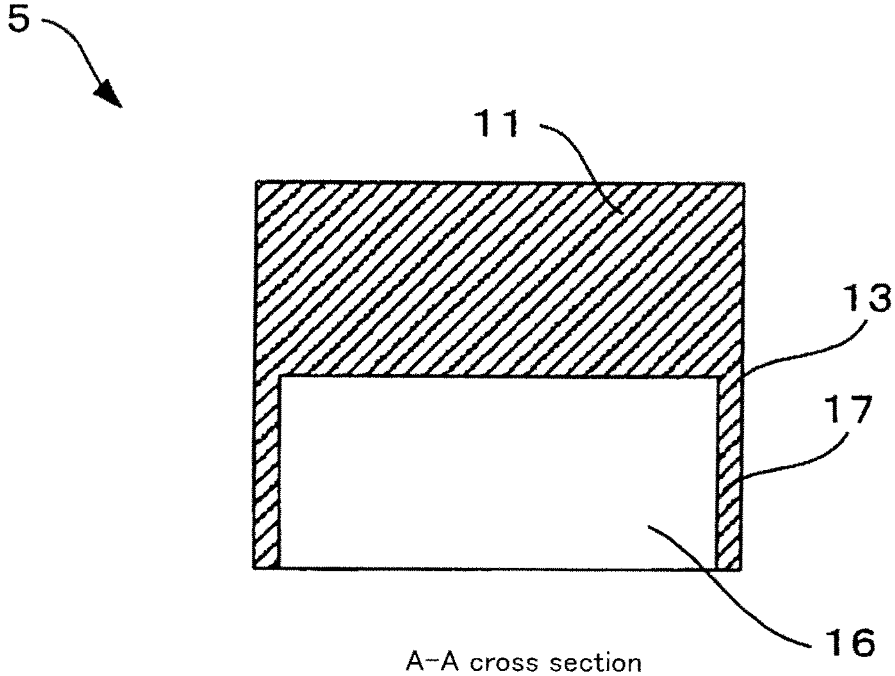
FIG. 7 is a cross-sectional view of the shock absorbing cleat taken along a line A-A in FIG. 5.
Figure 8:
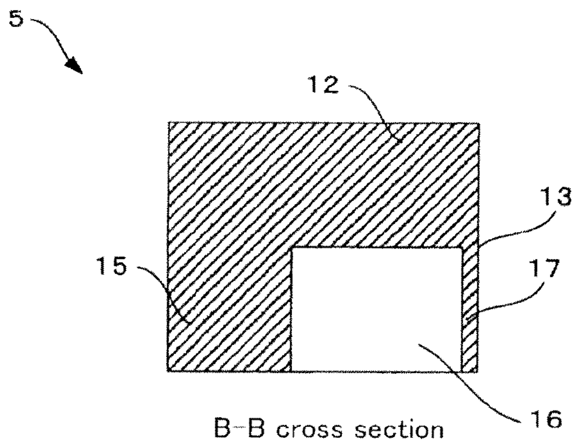
FIG. 8 is a cross-sectional view of the shock absorbing cleat taken along a line B-B in FIG. 5.
Figure 9:
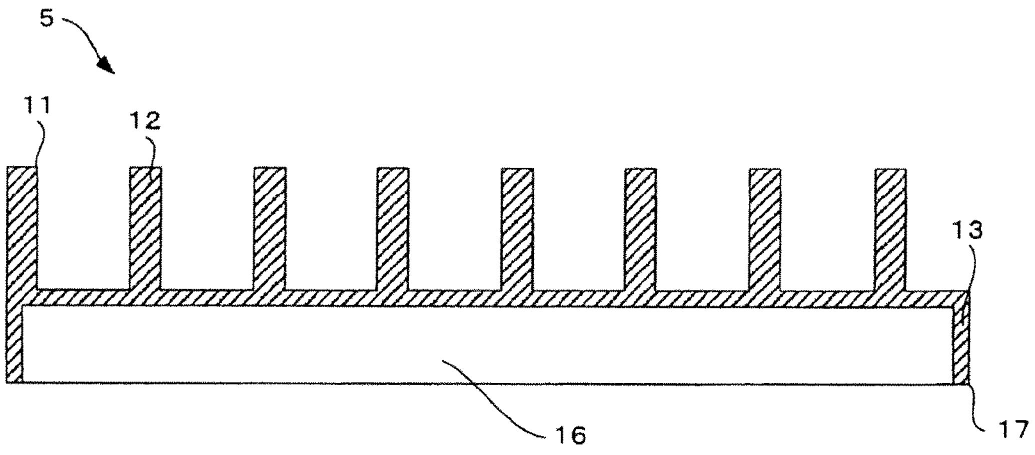
FIG. 9 is a cross-sectional view of the shock absorbing cleat taken along a line C-C in FIG. 4.

FIGS. 4 to 9 each illustrate the shock absorbing cleat 5. FIG. 4 is a plan view seen from the top. FIG. 5 is a front view. FIG. 6 is a bottom view seen from the bottom. FIG. 7 is a cross-sectional view illustrating a cross section AA of FIG. 5. FIG. 8 is a cross-sectional view illustrating a cross section BB of FIG. 5. FIG. 9 is a cross-sectional view illustrating a cross section CC of FIG. 4.

A hollow section 16 is provided at a back side of the base section 13 of the shock absorbing cleat 5. A bottom section 17 in contact with the notch 7 is provided around the hollow section 16. It should be noted that, as described above, each back side of the protruding sections 15 is arranged so as to plug each hole 14 of the convex sections 9 of the riser 3.

Urethane rubber having significantly lower rigidity than metals, such as aluminum and stainless steel, and the resin used for demarcation is used for the shock absorbing cleat 5 having the above configuration. This shock absorbing cleat 5 can be manufactured by an injection molding using a known die.

The following describes simulations on safety when a passenger falls down and results thereof in a case where urethane rubber having a Young's modulus of 200 MPa is used to form the shock absorbing cleat 5. The simulations were performed using HIC criterion that represents the degree of a head injury.

Figure 10:
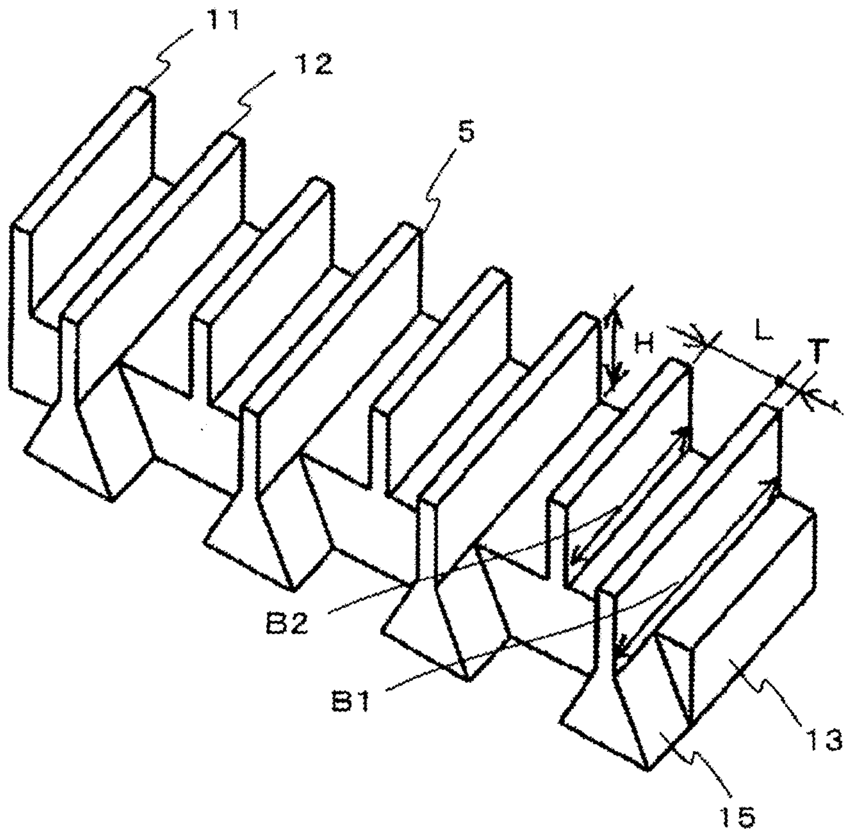
FIG. 10 is a plan view of the shock absorbing cleat according to the first embodiment seen from the top.

FIG. 10 is a perspective view illustrating a structure of the shock absorbing cleat 5 used in the simulation, and Table 1 is a table representing a dimensional range of each section of the shock absorbing cleat 5 illustrated in FIG. 10.

TABLE 1

| Site | Dimension |
|---|---|
| T | 2 mm to 4 mm |
| L | 5 mm to 7 mm |
| H | 10 mm to 15 mm |
| B1 | 20 mm to 50 mm |
| B2 | 14 mm to 44 mm |

[1] Criterion for Evaluating Head Injury (HIC)

First, an evaluation criterion of an injury and a probability of the injury when the passenger falls down and hits his or her head against the corner (section A of FIG. 1) of the step 1 will be described.

As the criterion for evaluating the head injury, Head Injury Criterion (hereinafter, referred to as "HIC") is known. The HIC is calculated by the following expression (1) where an impact acceleration applied to the head is α (t):

[Numeral 1]

$$HIC=\left[\frac{1}{t_2-t_1}\int_{t_1}^{t_2}\frac{\alpha(t)}{g}\,dt\right]^{2.5}\cdot(t_2-t_1) \tag{1}$$

In the above expression, t1 and t2 each represent arbitrary time during impact, and g represents a gravity acceleration.

Figure 11:
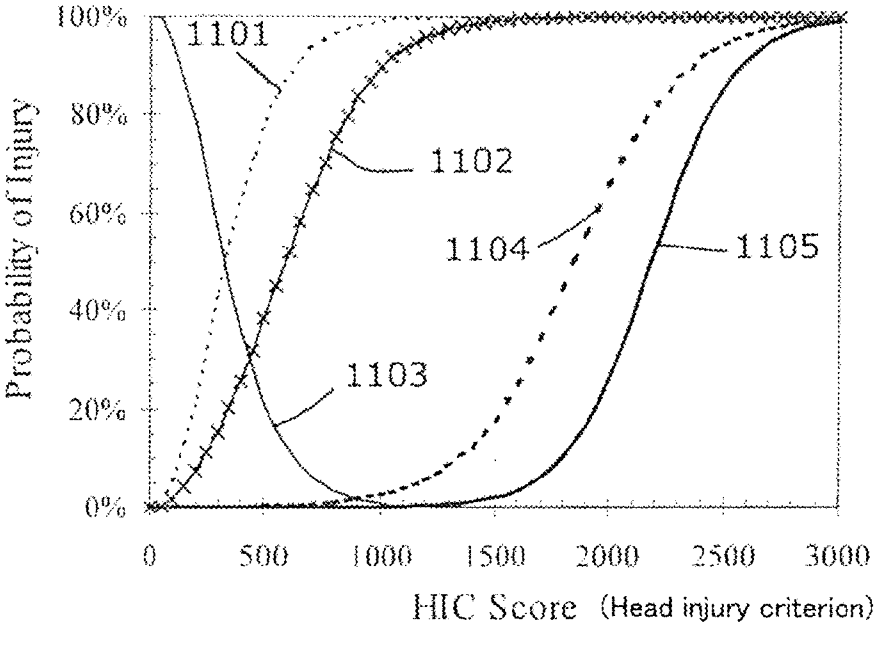
FIG. 11 is an explanatory view for explaining an injury risk curve.

FIG. 11 is a graph illustrating an injury risk curve. In FIG. 11, a curve 1101 is a curve representing a probability of a mild head damage, a curve 1102 is a curve representing a probability of a moderate head damage, a curve 1103 is a curve representing a probability of absence of injury, a curve 1104 is a curve representing a probability of a fatal head damage, and a curve 1105 is a curve representing a probability of death.

When the HIC is identified, the injury probability can be estimated from the injury risk curve of FIG. 11. The injury risk curve has an HIC value on a horizontal axis and a probability of the head injury or death on a vertical axis. Thus, when the HIC value is identified, the probability according to the degree of the head injury can be estimated from the injury risk curve. Here, description will be given taking "mild head injury" represented by the curve 1101 as an example. Referring to the curve 1101, when the HIC is equal to or more than 1000, the head injury probability becomes nearly 100%, while when the HIC is equal to or less than 1000, the head injury probability abruptly decreases.

[2] HIC Calculation Method and Calculation Model (Calculation Based on Newmark β Method)

Next, an HIC calculation method and a calculation model based on Newmark β method when the passenger falls down and hits his or her head against the corner (section A of FIG. 1) of the step 1 will be described. The Newmark β method (called average acceleration method) is an analysis method using numerical calculation according to vibration equation.

Figure 12:
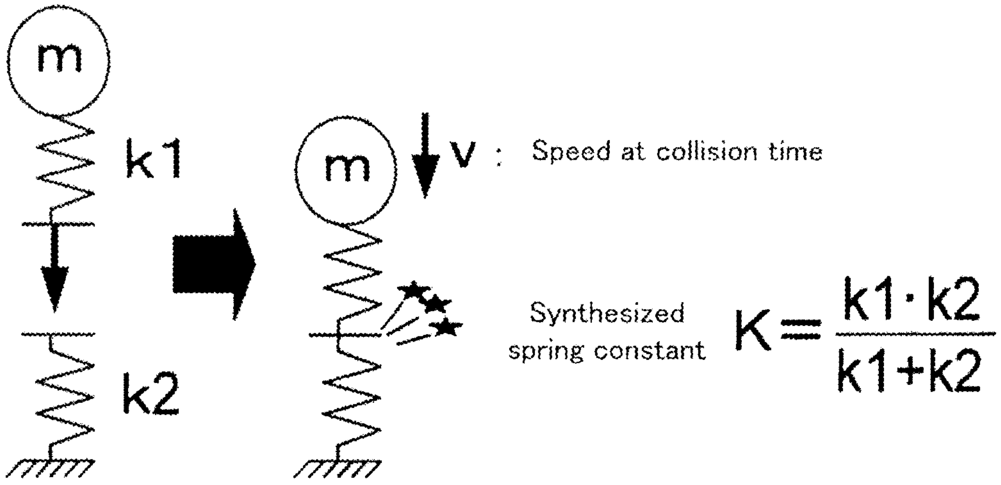
FIG. 12 is an exemplary view illustrating an HIC calculation model.

FIG. 12 illustrates a calculation model. In this model, it is assumed that a spring constant of the shock absorbing cleat 5 disposed at the corner of the step 1 is k2 and that a head having a mass of m falls and collides with a spring having the spring constant of k2. A symbol k1 represents a spring constant of the skull. Further, it is assumed that the head (having a mass of m) hits against the spring at a speed of v and that the m moves in a state where k1 and k2 are in a unified manner after the collision as illustrated in a right part of FIG. 12.

The motion of m was calculated according to the Newmark β method represented by the following expressions (2) to (4).

[Numeral 2]

$$\left(m+\frac{\Delta t}{2}c+\beta\Delta t^2k\right)\ddot{x}_{n+1}= F_n-c\left(\dot{x}_n+\frac{\Delta t}{2}\ddot{x}_n\right)-k\left\{x_n+\Delta t\dot{x}_n+\left(\frac{1}{2}-\beta\right)\Delta t^2\ddot{x}_n\right\} \tag{2}$$

$$\dot{x}_{n+1}=\dot{x}_n+\frac{\Delta t}{2}(\ddot{x}_n+\ddot{x}_{n+1}) \tag{3}$$

$$x_{n+1}=x_n+\Delta t\dot{x}_n+\left(\frac{1}{2}-\beta\right)\Delta t^2\ddot{x}_n+\beta\Delta t^2\ddot{x}_{n+1} \tag{4}$$

That is, with a speed at the collision time being v, an initial displacement $x_0$ being 0, an initial speed $\dot{x}_0$ being v, and an initial acceleration $\ddot{x}_0$ being 0, the displacement of m (x), speed ($\dot{x}$) thereof, and acceleration ($\ddot{x}$) thereof were sequentially calculated at every fixed interval. In the following expressions (2) to (4), an attenuation C and an external force term F are each set to 0, and β is set to ⅙.

The speed v at the collision time is assumed as follows.

Figure 13:
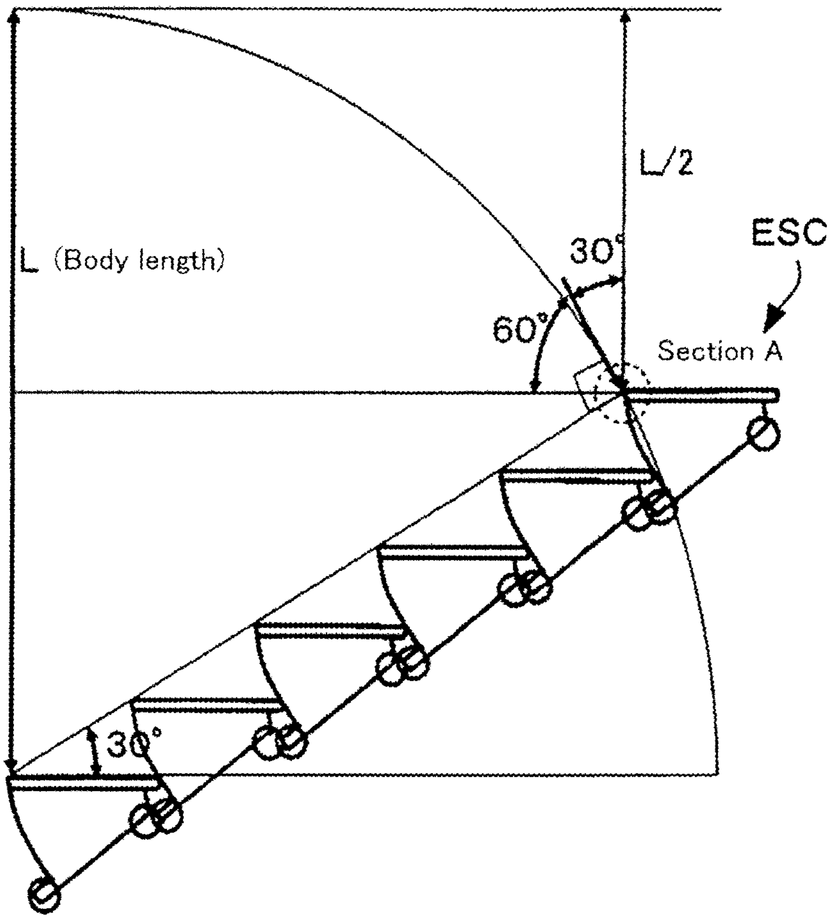
FIG. 13 is a side view explaining a situation in which a passenger on an escalator falls down.

It is assumed, as illustrated in FIG. 13, that a person having a body length of L falls down in an upright position to an upper floor side of an escalator ESC and collides with the corner (section A) of the step 1 as represented by a circular arc of FIG. 13. Since an inclined angle of the escalator ESC is 30°, the head of the person collides with the corner at an angle of 60° with respect to a horizontal plane. A fall length at this time in a vertical direction is half of the body length (L/2). Assuming that the speed at the collision time is v, when potential energy corresponding to the fall length in the vertical direction is converted into kinetic energy, the following expression (5) is satisfied and, consequently, the speed v at the collision time can be calculated by the following expression (6).

[Numeral 3]

$$mg\frac{L}{2}=\frac{1}{2}mv^2 \tag{5}$$

$$v=\sqrt{gL} \tag{6}$$

When L is set to 1.72 m which is the average body length of adults and the gravity acceleration g is set 9.8 m/sec$^2$, v=4.11 m/sec. is obtained.

An impact on the trunk at the collision time is ignored since bending rigidity of the neck is very small. Further, strictly speaking, the kinetic energy of the head at the collision time is represented by a sum of the kinetic energy of translational motion and the kinetic energy of rotational motion; however, the kinetic energy of the rotational motion is small and is thus ignored.

When the mass m of the head, spring constant k2 of the shock absorbing cleat 5, and spring constant k1 of the skull are identified, the HIC can be calculated in the way described above.

[3] Analysis Method of Spring Constant of Shock Absorbing Cleat and Results Thereof (Calculation Based on FEM)

In order to calculate the spring constant k2 of the shock absorbing cleat 5, an FEM (Finite Element Method) analysis is performed for four cases listed in Table 2 to calculate displacement to be generated when force is applied from the head. The Young's modulus of a material is set to 200 MPa in each of the four cases. The spring constant was calculated from an applied load and obtained displacement. Descriptions of each of the four cases are made below.

TABLE 2

| Site | Case (1) | Case (2) | Case (3) | Case (4) |
|---|---|---|---|---|
| t | 4 mm | 4 mm | 2 mm | 2 mm |
| L | 5 mm | 5 mm | 7 mm | 7 mm |
| H | 10 mm | 10 mm | 10 mm | 15 mm |
| B1 | 50 mm | 20 mm | 20 mm | 20 mm |
| B2 | 44 mm | 14 mm | 14 mm | 14 mm |

Case (1): A model having the highest rigidity (spring constant) among the dimensional ranges of the shock absorbing cleat 5 listed in Table 2 (Young's modulus of the material is fixed).

Case (2): A model obtained by reducing the dimensions of B1 and B2 of the model of Case (1).

Case (3): A model obtained by reducing the dimension of t and increasing the dimension of L of the model of Case (2).

Case (4): A model obtained by increasing the dimension of H of the model of Case (3).

When the Young's modulus is fixed, the rigidity which is the spring constant obtained at the time of head collision is smallest in Case (4), followed by Case (3), Case (2), and Case (1).

Figure 14:
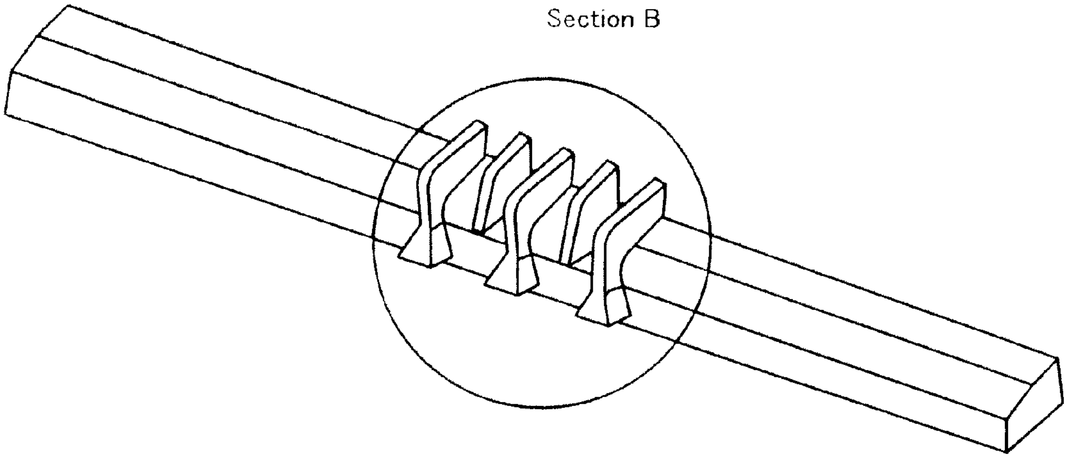
FIG. 14 is a perspective overall view illustrating an analysis model.
Figure 15:
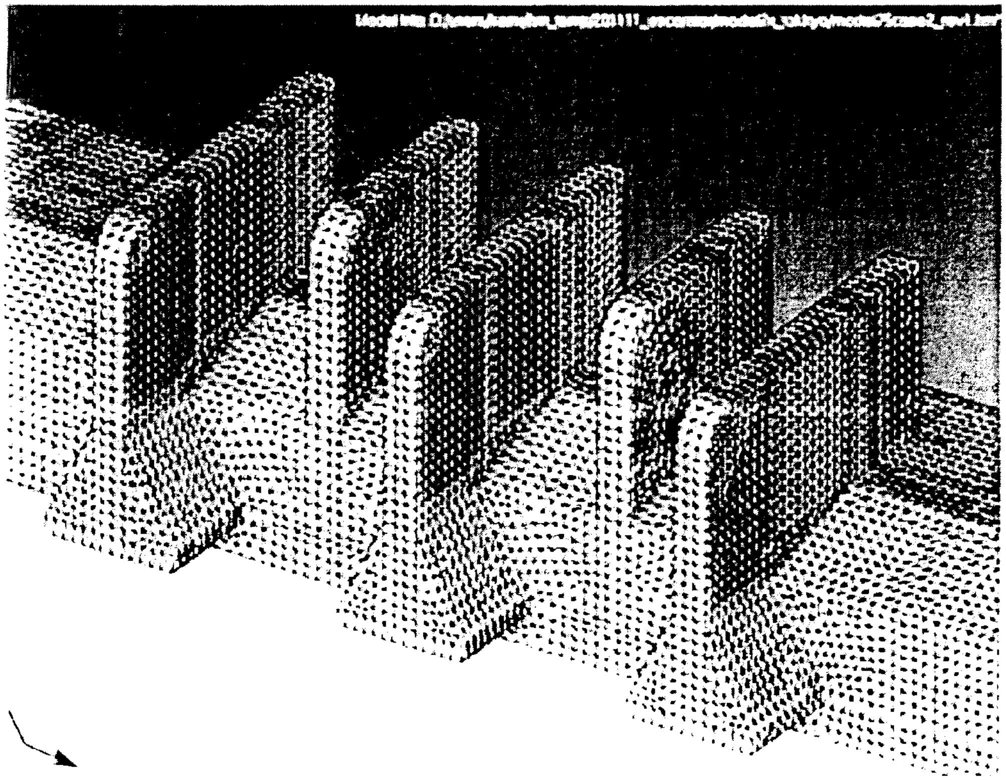
FIG. 15 is a perspective view illustrating a part of the analysis model in an enlarged manner.
Figure 16:
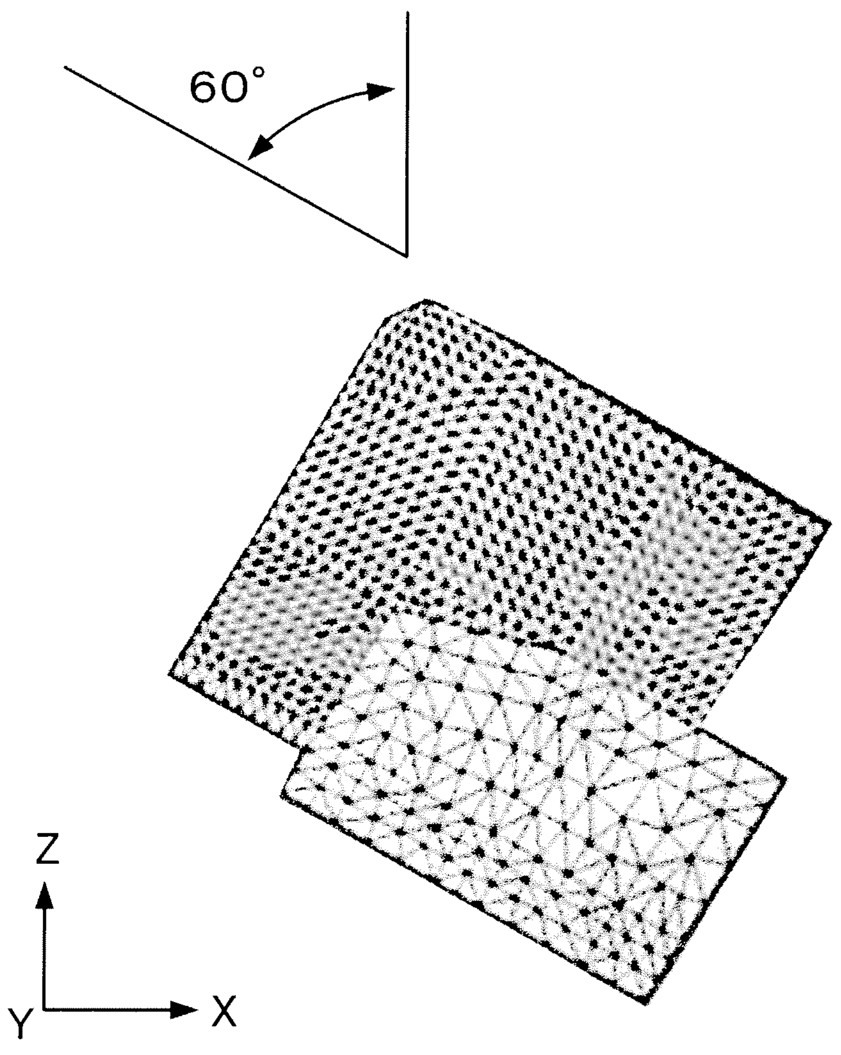
FIG. 16 is a side view of the analysis model.

An analysis model of Case (3) is illustrated in FIGS. 14 to 16. FIG. 14 is an overall view corresponding to the shock absorbing cleat illustrated in FIG. 10, FIG. 15 is an enlarged view of a section B of FIG. 14, and FIG. 16 is a side view of the section B of FIG. 14. In FIG. 14, the model includes entire length of the base section 13, however, it includes only three of the long convex sections 12 and only two of the short convex sections 11.

As illustrated in FIG. 16, the analysis model is inclined by 60° with respect to a vertical axis (Z-axis of FIG. 16). A load application direction when the head of a person collides with the step 1 at an angle of 60° with respect to the horizontal plane corresponds to the Z-axis direction in this analysis model.

The analysis model is created using a three-dimensional tetrahedral element. The displacement of nodes on the bottom surfaces of the base section 13 and protruding section 15 is restrained. The Young's modulus of the material is set to 200 MPa.

Figure 17:
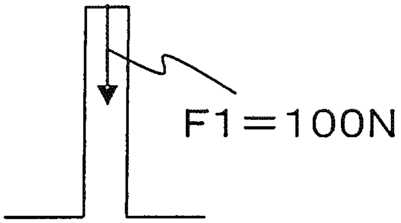
FIG. 17 is an exemplary view explaining an application state of a load to the analysis model.
Figure 18:
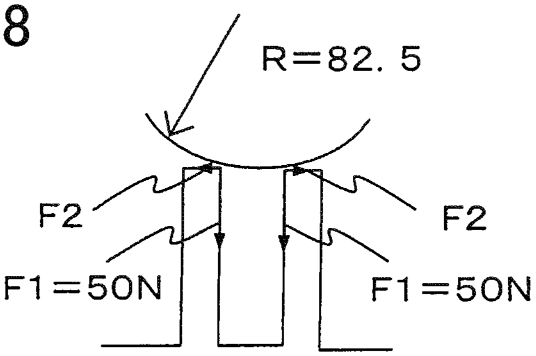
FIG. 18 is an exemplary view explaining the load application state in the analysis model.

When the head collides with the shock absorbing cleat 5, it may collide with one long convex section 12 or two long convex sections 12. In the former case, as illustrated in FIG. 17, a load of 100 N is applied in the Z-direction of the analysis model. In the latter case, as illustrated in FIG. 18, a load of 50 N (F1 in FIG. 18) is applied to each of the two long convex sections 12 in the Z-direction of the analysis model. However, in this case, with a radius of the head being 82.5 mm, a load F2 is applied in a direction perpendicular to F1 so as to make a resultant vector of F1 and F2 coincide with a normal direction of the head. A value of F2 is determined by the radius (82.5 mm) of the head and a value of L (shown in FIG. 10). Thus, F2 is determined as F2=4.26N in the Cases (1) and (2) and F2=4.87N in the Cases (3) and (4)).

Figure 19:
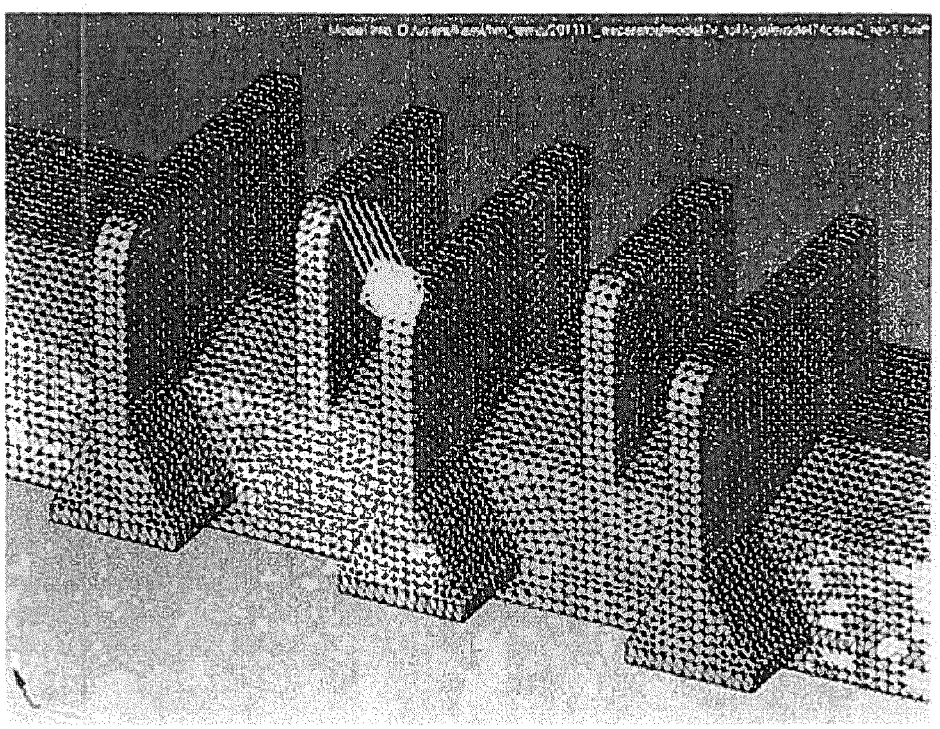
FIG. 19 is a perspective view explaining the load application state in the analysis model.
Figure 20:
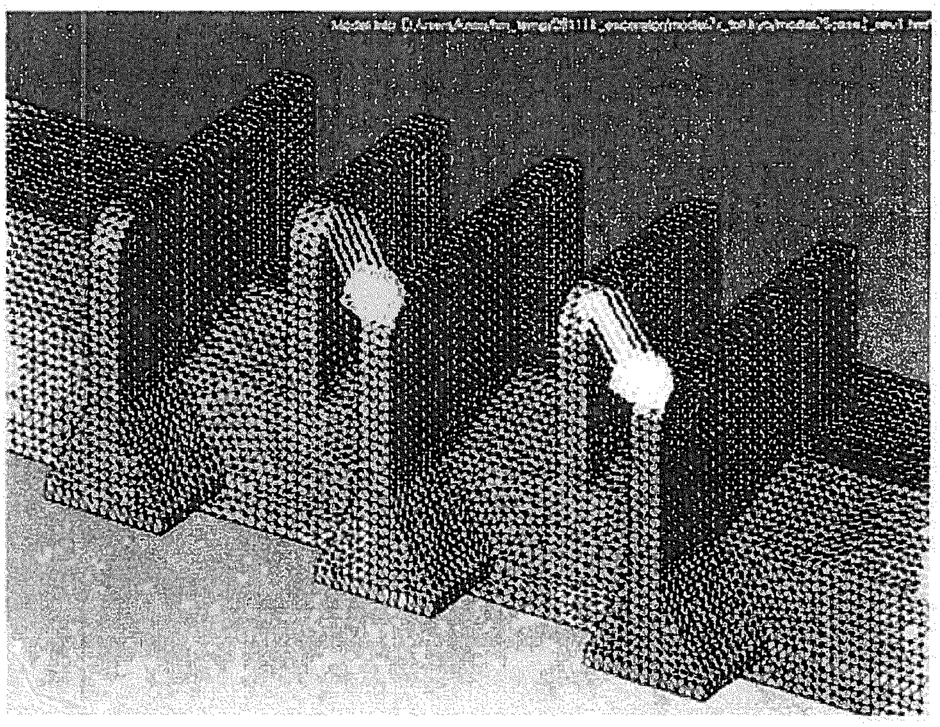
FIG. 20 is a perspective view explaining the load application state in the analysis model.
Figure 21:
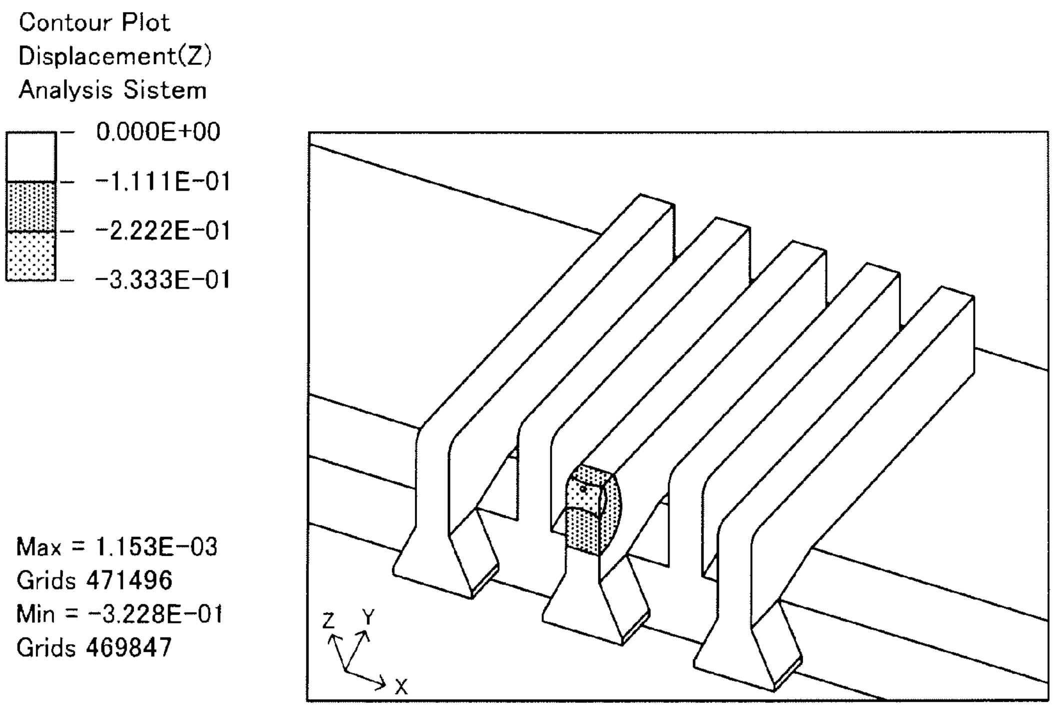
FIG. 21 is a perspective view illustrating an analysis result of Case (1) in a case where a head collides with one long convex section.
Figure 22:
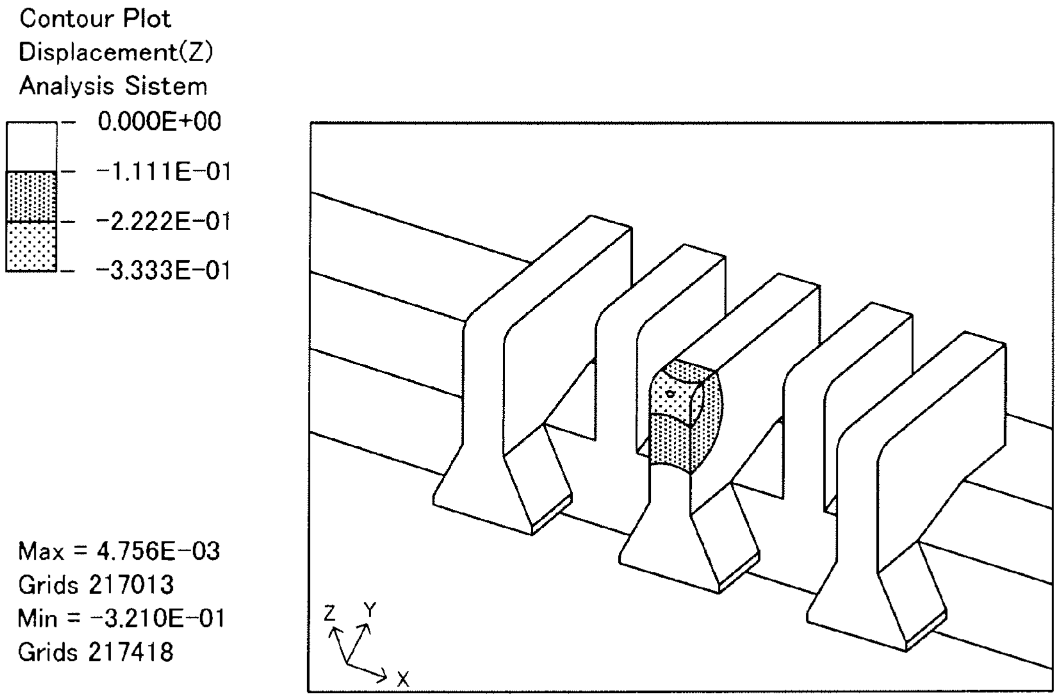
FIG. 22 is a perspective view illustrating an analysis result of Case (2) in the case where a head collides with one long convex section.
Figure 23:
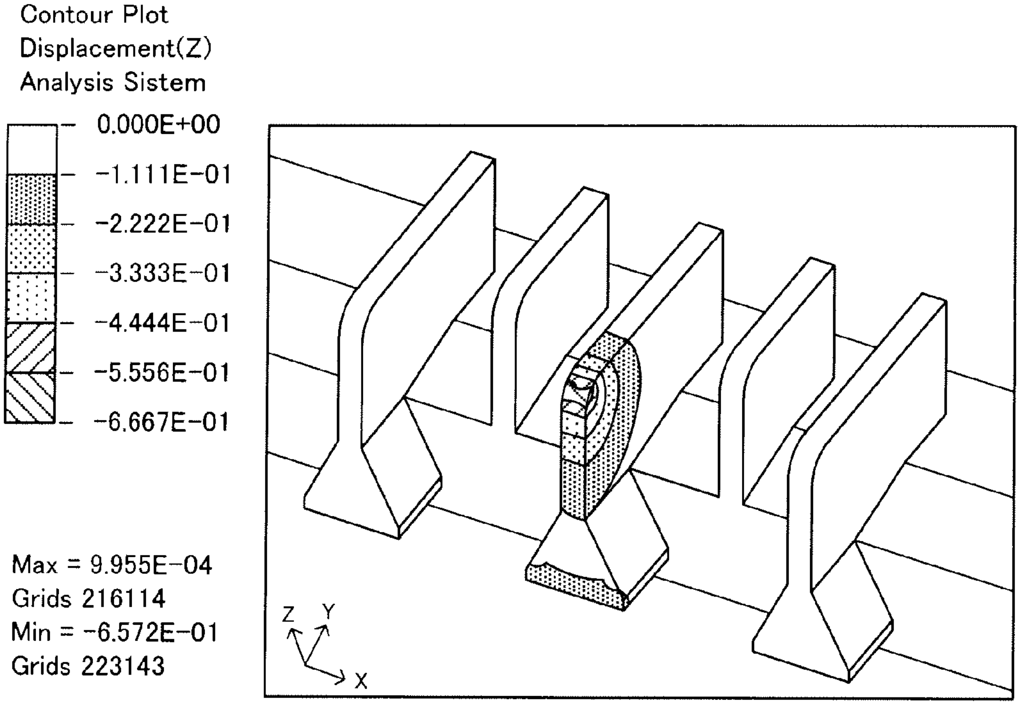
FIG. 23 is a perspective view illustrating an analysis result of Case (3) in the case where a head collides with one long convex section.
Figure 24:
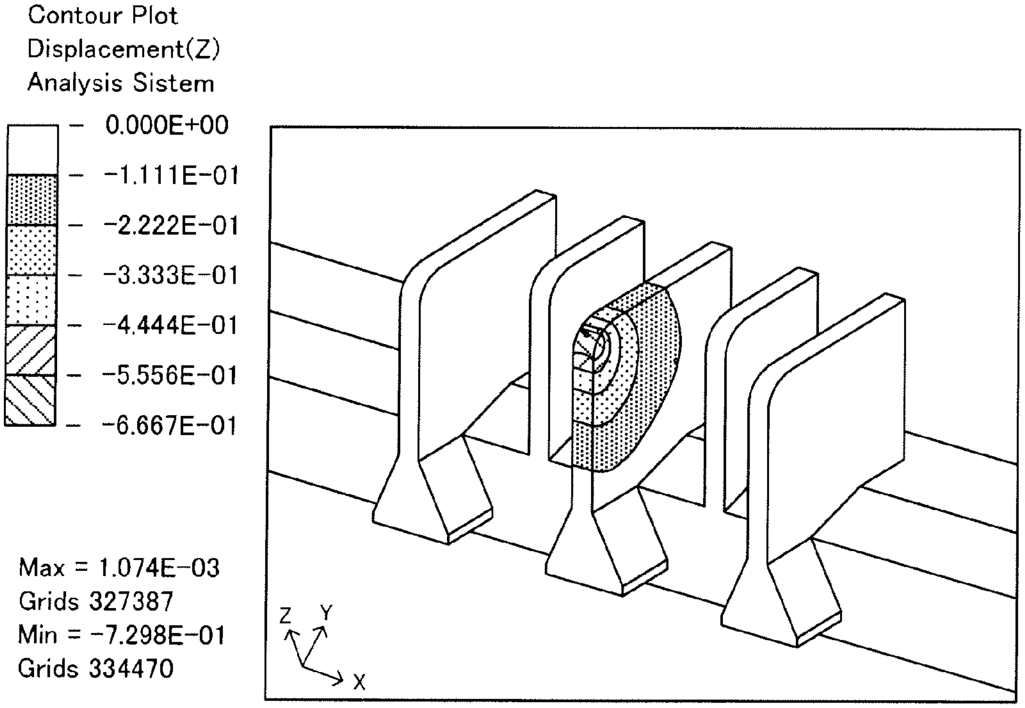
FIG. 24 is a perspective view illustrating an analysis result of Case (4) in the case where a head collides with one long convex section.
Figure 25:
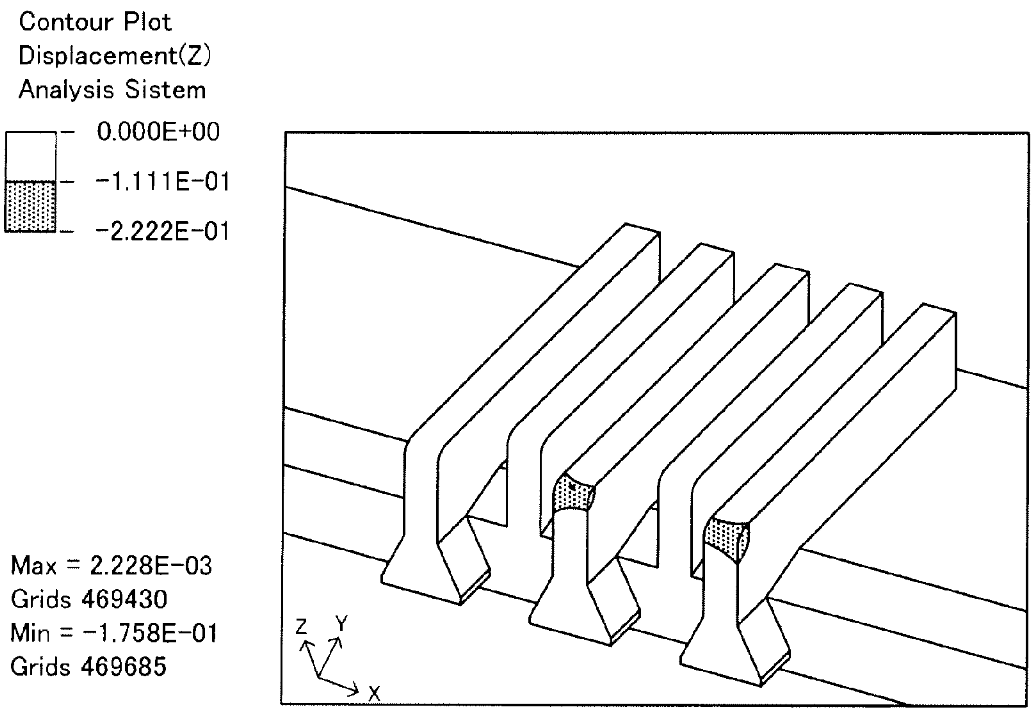
FIG. 25 is a perspective view illustrating an analysis result of Case (1) in a case where a head collides with two long convex sections.
Figure 26:
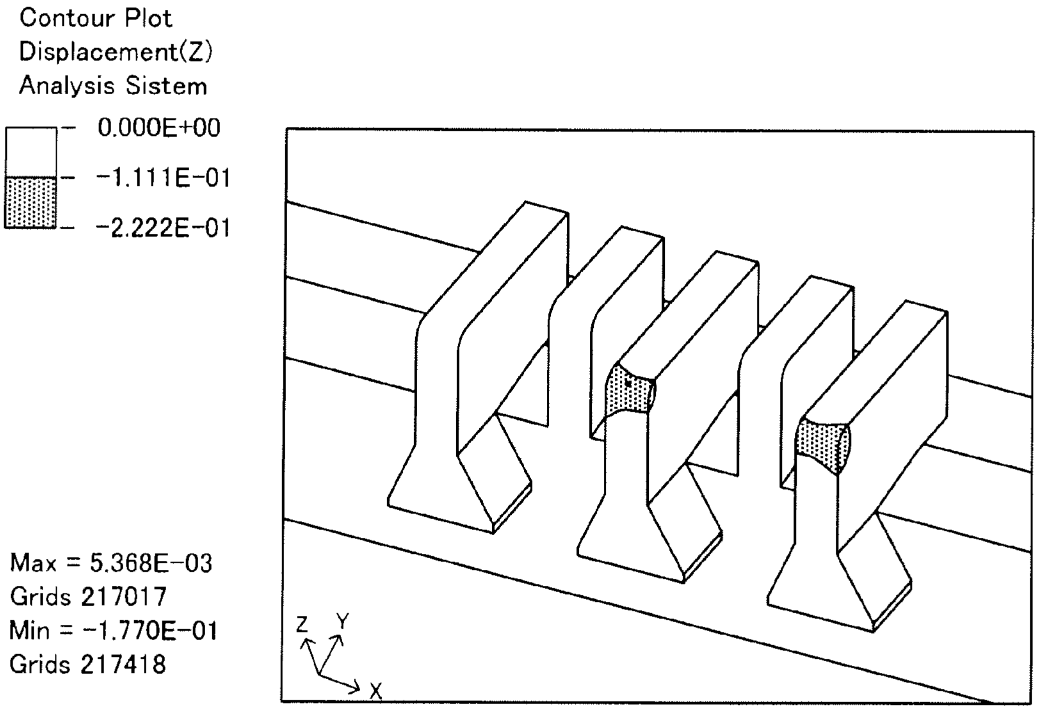
FIG. 26 is a perspective view illustrating an analysis result of Case (2) in the case where a head collides with two long convex sections.
Figure 27:
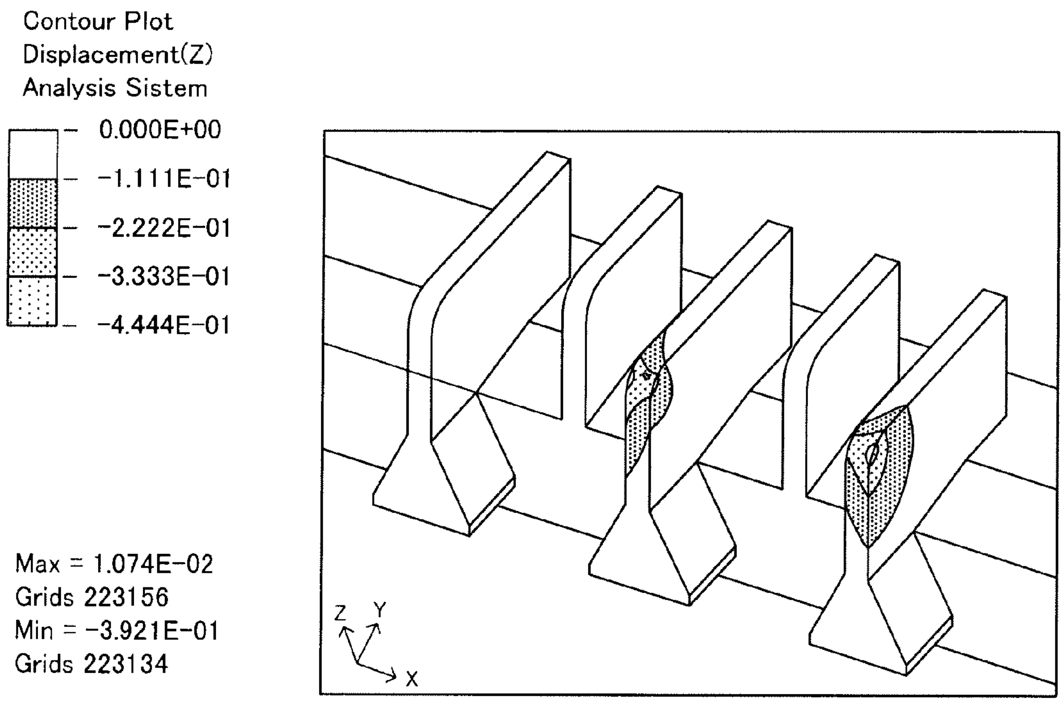
FIG. 27 is a perspective view illustrating an analysis result of Case (3) in the case where a head collides with two long convex sections.
Figure 28:
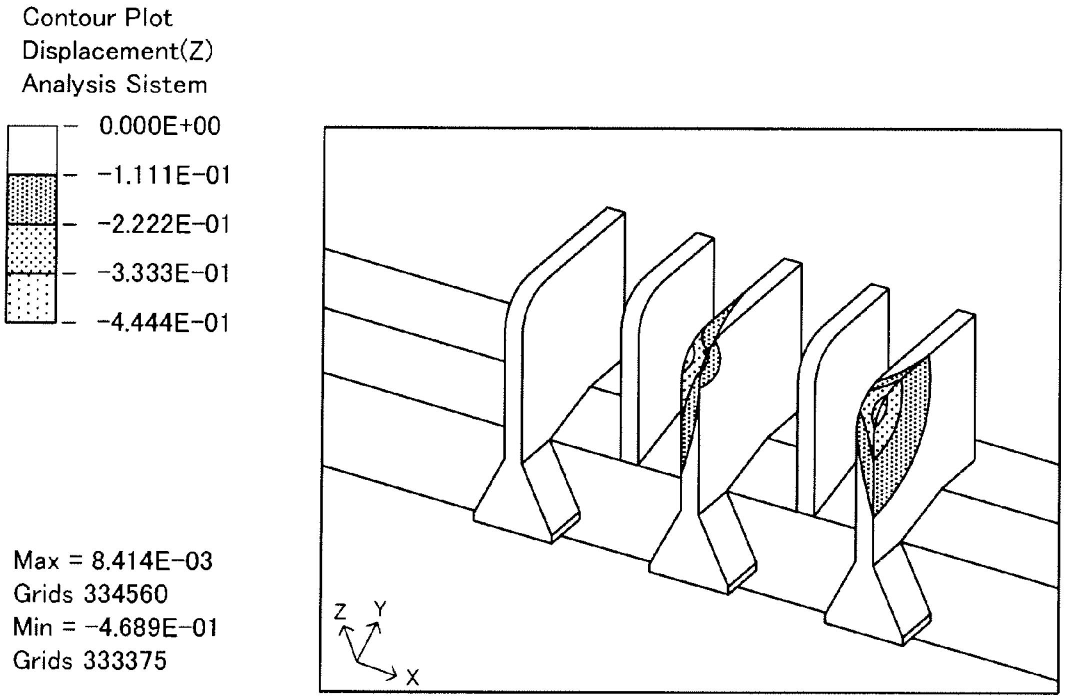
FIG. 28 is a perspective view illustrating an analysis result of Case (4) in the case where a head collides with two long convex sections.

FIG. 19 illustrates an application state of the load in a case where the head collides with one long convex section 12, and FIG. 20 illustrates the load application state in a case where the head collides with two long convex sections 12.

Analyses are made under the above conditions to calculate a displacement in the Z-axis direction when the load is applied.

Analysis results of the Cases (1) to (4) obtained in the case where the head collides with one long convex section 12 are illustrated in FIGS. 21 to 24, respectively. Further, analysis results of the Cases (1) to (4) obtained in the case where the head collides with two long convex sections 12 are illustrated in FIGS. 25 to 28, respectively. In each of FIGS. 21 to 28, a circular arc concentrically spreading around the corner portion of one (or two) long convex section 12 represents a displacement amount (0 mm to 1 mm) by the shading thereon.

The displacement obtained by the analysis and spring constant calculated from a relationship between the displacement and load are shown in Tables 3 and 4. Table 3 corresponds to the case where the head collides with one long convex section 12, and Table 4 corresponds to the case where the head collides with two long convex sections 12.

TABLE 3

| Application of 100 N to one long convex section | | | | |
|---|---|---|---|---|
| | Case (1) | Case (2) | Case (3) | Case (4) |
| Displacement (mm) | 0.293 | 0.294 | 0.620 | 0.679 |
| Spring constant (N/mm) | 341.3 | 340.6 | 161.2 | 147.2 |

TABLE 4

| Application of 100 N to two long convex sections | | | | |
|---|---|---|---|---|
| | Case (1) | Case (2) | Case (3) | Case (4) |
| Displacement (mm) | 0.146 | 0.147 | 0.310 | 0.339 |
| Spring constant (N/mm) | 683.1 | 680.3 | 322.6 | 294.8 |

These results reveal that, when the Young's modulus is fixed (200 MPa), the spring constant of the shock absorbing cleat 5 is largest (683.1 N/mm) in Case (1) in the case where the head collides with two long convex sections 12 and is smallest (147.2 N/mm) in Case (4) in the case where the head collides with one long convex section 12.

[4] Calculation Conditions of HIC and Calculation Results Thereof (4-1) in Case where Spring Constant of Shock Absorbing Cleat is Smallest (Young's Modulus is Fixed)

The spring constant of the shock absorbing cleat 5 is determined by the dimension of the shock absorbing cleat 5 and the Young's modulus of the material to be used.

First, the HIC is calculated for a case where when the Young's modulus of the material is fixed (200 MPa) and the spring constant of the shock absorbing cleat 5 is smallest (k2=147.2 N/mm).

The average mass (4.5 kg) of the head of an adult is used as m in the model of FIG. 12.

The skull is regarded as a rigid body, and the spring constant (k1) thereof is set to Do. That is, the synthesized spring constant K of FIG. 12 is equal to k2.

In the calculation model of FIG. 12, the motion of the head (m) after the collision is analyzed, with m being 4.5 kg, k1 being and k2 being 147.2 N/mm. A calculation example using the Newmark β method represented by the expressions (2) to (4) is illustrated in FIG. 29.

Figure 29:
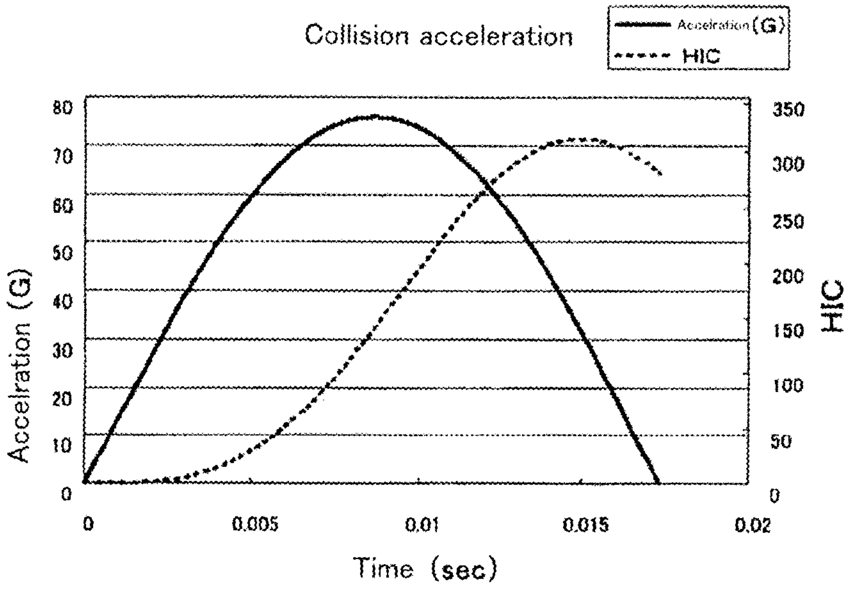
FIG. 29 is an explanatory view illustrating a result of calculation of a motion of the head after the collision.

An acceleration applied to the head (mass m) illustrated in FIG. 29 is calculated until the acceleration becomes 0 once again after the collision. A calculation result of the HIC represented by the expression (1) obtained by using the above acceleration is also plotted in FIG. 29. The value of the HIC plotted in FIG. 29 is obtained by setting an integration start time ($t_1$ of the expression (1)) to time 0 and by sequentially increasing an integration end time ($t_2$ of the expression (1)) from the time 0. In this example, the HIC becomes maximum after the acceleration becomes maximum.

Figure 30:
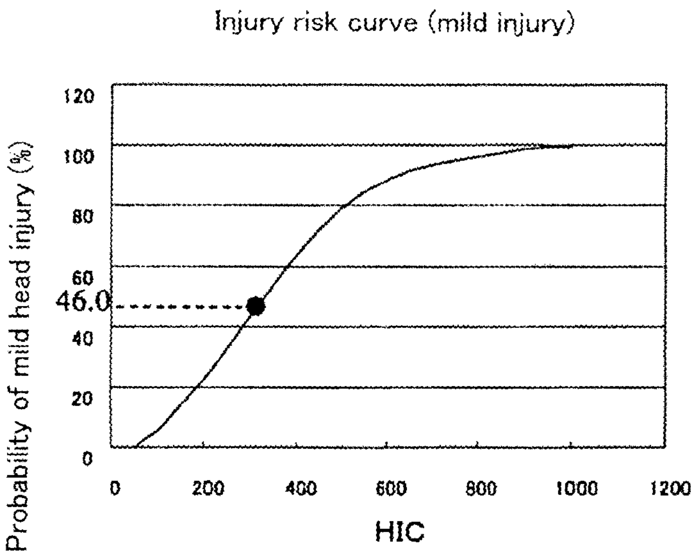
FIG. 30 is an explanatory view in which a calculation result is plotted on the injury risk curve.

In FIG. 30, the calculated HIC value is plotted on the injury risk curve of FIG. 11. As the injury risk curve, the curve (curve represented by A in FIG. 11) of "mild head injury" is used. In this example, a probability of the injury is 46.0%.

The above calculations are performed with the Young's modulus of the material set to 200 MPa.

Assumed is a case where the Young's modulus of the material is changed in a range of from 50 MPa to 70000 MPa. The spring constant of the shock absorbing cleat 5 is assumed to be proportional to the Young's modulus of the material. For example, in the case of polycarbonate (Young's modulus: 2300 MPa) conventionally used for demarcation, when the spring constant k2 of the shock absorbing cleat 5 is represented by k2P, k2P is calculated according to the following expression.

$$k2p=147.2\times(2300/200)=1693\text{ N/mm} \quad (7)$$

The spring constant (k2) of the shock absorbing cleat 5 is calculated while the Young's modulus of the material is changed in a range of from 50 MPa to 70000 MPa, and the motion of the head (m) after the collision is calculated using the Newmark β method represented by the expressions (2) to (4). At this point, k1 is set to ∞.

The HIC represented by the expression (1) can be calculated using the obtained acceleration of the head (m). After calculation of the HIC, the injury probability can be estimated from the injury risk curve of FIG. 11.

Figure 31:
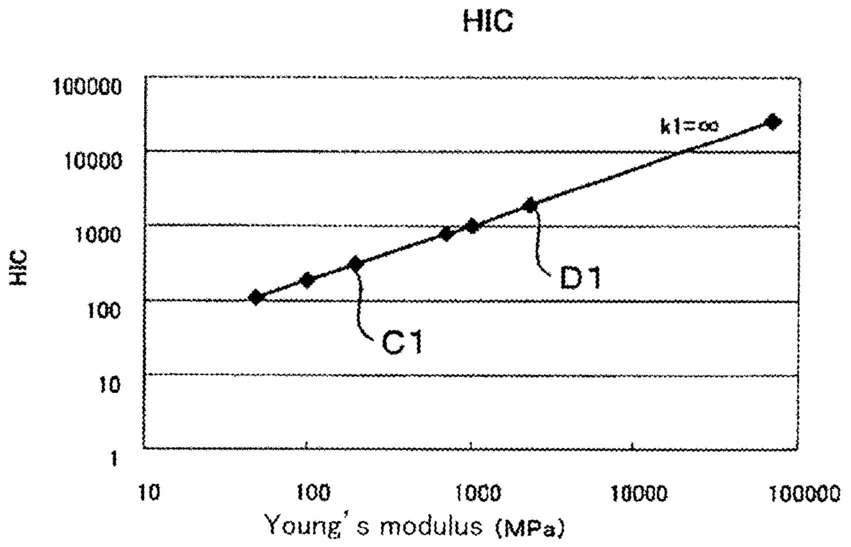
FIG. 31 is an explanatory view illustrating a relationship between the Young's modulus of a material and HIC when the Young's modulus of the material is changed.
Figure 32:
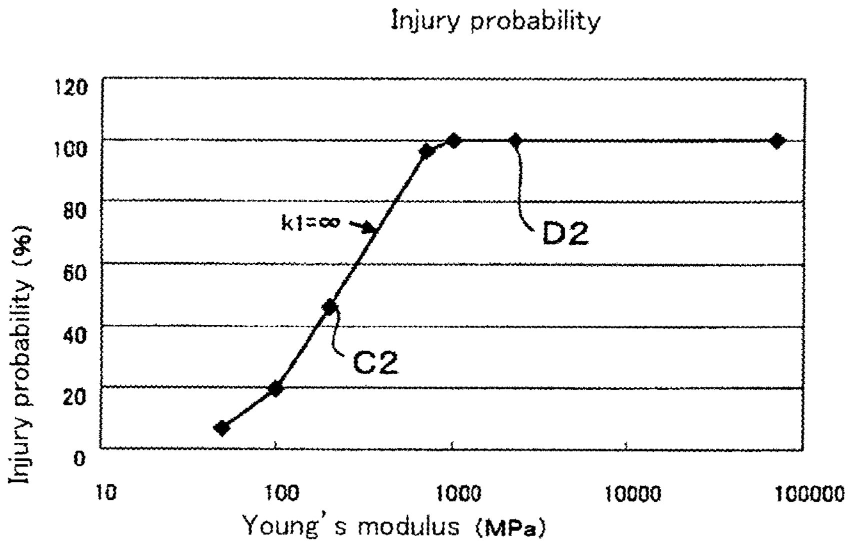
FIG. 32 is an explanatory view illustrating a relationship between the Young's modulus of the material and injury probability when the Young's modulus of the material is changed.

The HIC and injury probability thus calculated are illustrated in FIGS. 31 and 32, respectively. In FIG. 31, the HIC is calculated with the Young's modulus of the material plotted on a horizontal axis. In FIG. 32, the injury probability is calculated with the Young's modulus of the material plotted on a horizontal axis.

In FIGS. 31 and 32, C1 and C2 each represent a case where the Young's modulus of the material is 200 MPa, and D1 and D2 each represent a case where the Young's modulus of the material is 2300 MPa (polycarbonate).

The above are cases where the spring constant of the skull is regarded as a rigid body (k1=∞). Some literatures describe that the spring constant (k1) of the skull is about 1000 N/mm, which, however, is not certain. Thus, calculations are performed in the same manner for cases where k1 is 3000 N/mm and where k1 is 1000 N/mm, in addition to the case where k1 is ∞ (case where the skull is regarded as a rigid body).

Figure 33:
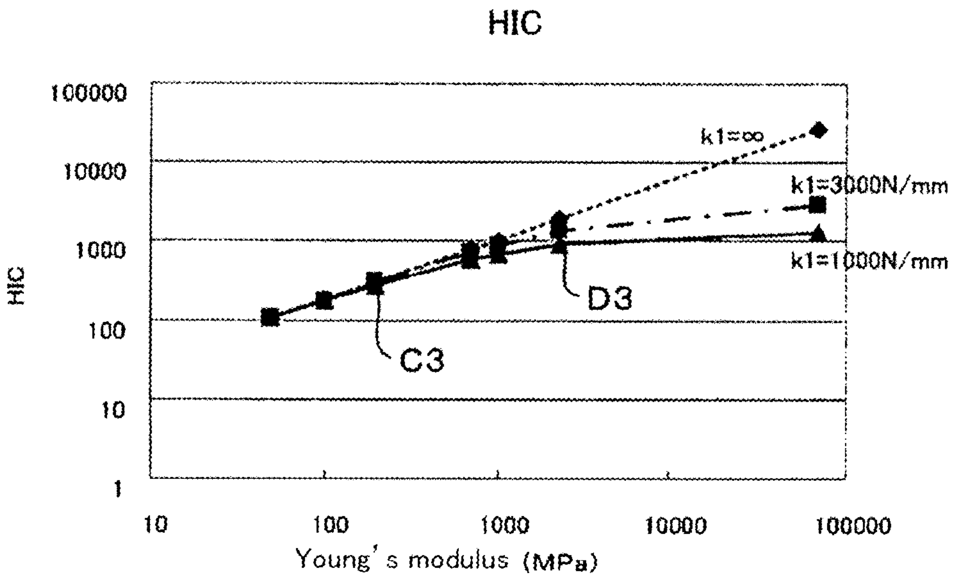
FIG. 33 is an explanatory view in which a result obtained when a spring constant of the skull is changed is added to the result of FIG. 31.
Figure 34:
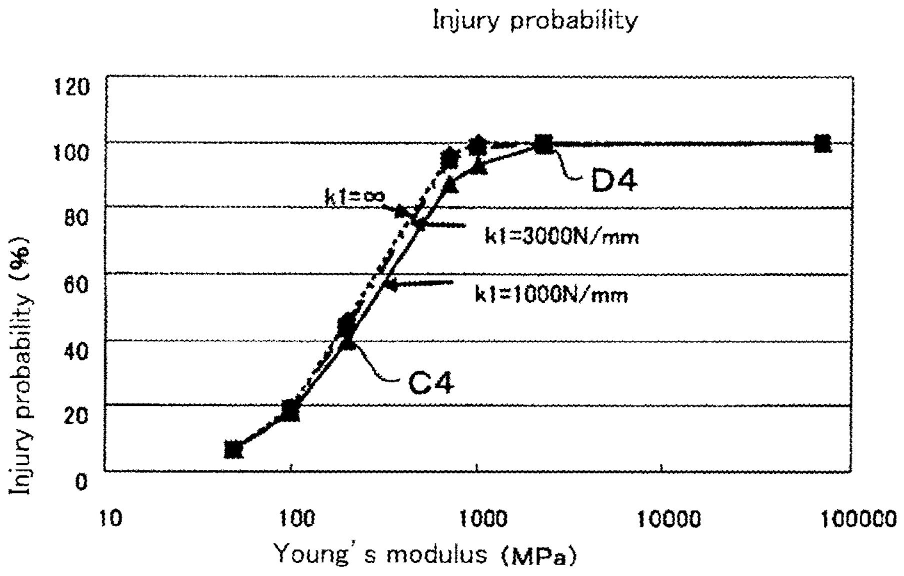
FIG. 34 is an explanatory view in which a result obtained when a spring constant of the skull is changed is added to the result of FIG. 32.

Results of the calculations are illustrated in FIGS. 33 and 34. In FIGS. 33 and 34, results obtained in the cases where k1 is 3000 N/mm and where k1 is 1000 N/mm are added to the calculation results illustrated in FIGS. 31 and 32, respectively. In FIG. 33, the HIC is calculated with the Young's modulus of the material plotted on a horizontal axis. In FIG. 34, the injury probability is calculated with the Young's modulus of the material plotted on a horizontal axis.

FIG. 33 reveals that when the Young's modulus of the material is high, the HIC value also significantly changes depending on the spring constant (k1) of the skull. On the other hand, when the Young's modulus of the material is low, the HIC value does not change so much even when the spring constant (k1) of the skull is changed. The spring constant (k2) of the shock absorbing cleat 5 is proportional to the Young's modulus, so that when the Young's modulus of the material is high, the spring constant (k2) of the shock absorbing cleat 5 is larger than the spring constant (k1) of the skull. On the other hand, when the Young's modulus of the material is low, the spring constant (k2) of the shock absorbing cleat 5 is equal to or smaller than the spring constant (k1) of the skull.

FIG. 34 reveals that when the Young's modulus of the material is high, the HIC value exceeds 1000, and the injury probability reaches 100%. When the Young's modulus of the material is low (when the Young's modulus is in a range equal to and less than 1000 MPa), the HIC value falls below 1000 as illustrated in FIG. 33, that is, as the Young's modulus of the material becomes lower, the injury probability abruptly decreases.

(4-2) in Case where Spring Constant of Shock Absorbing Cleat is Largest (Young's Modulus is Fixed)

As in the case of (4-1), the HIC and injury probability are calculated for a case where the Young's modulus of the material is fixed and the spring constant of the shock absorbing cleat 5 is largest (k2=683.1 N/mm).

The spring constant (k2) of the shock absorbing cleat 5 when the Young's modulus of the material is 200 MPa is set to 683.1 N/mm, and the spring constant (k2) is assumed to be proportional to the Young's modulus of the material. Further, calculation is performed for cases where k1 is 3000 N/mm and where k1 is 1000 N/mm, in addition to the case where the spring constant (k1) of the skull is co (case where the skull is regarded as a rigid body).

Figure 35:
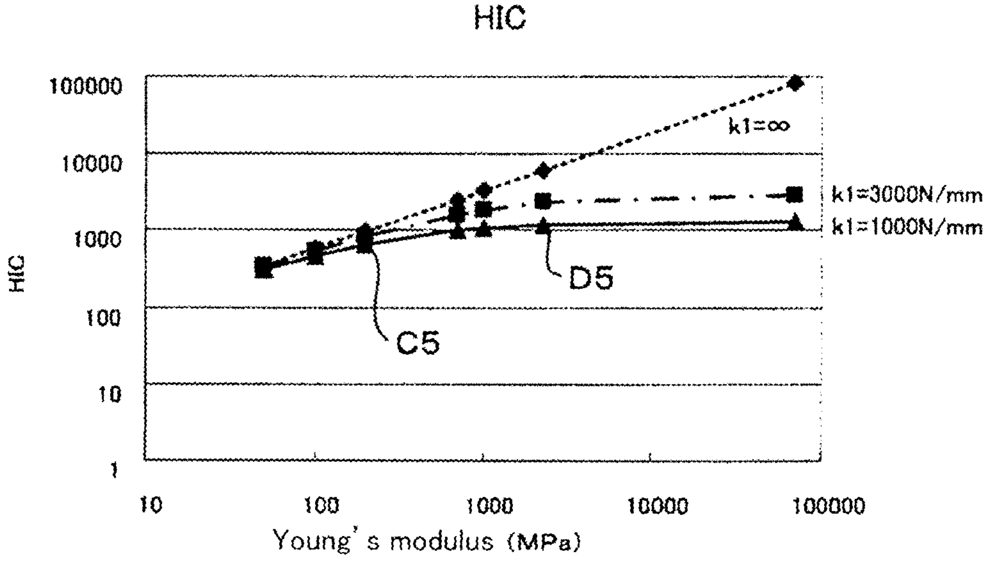
FIG. 35 is an explanatory view illustrating a relationship between the Young's modulus of the material and HIC when the Young's modulus of the material and the spring constant of the skull are changed.
Figure 36:
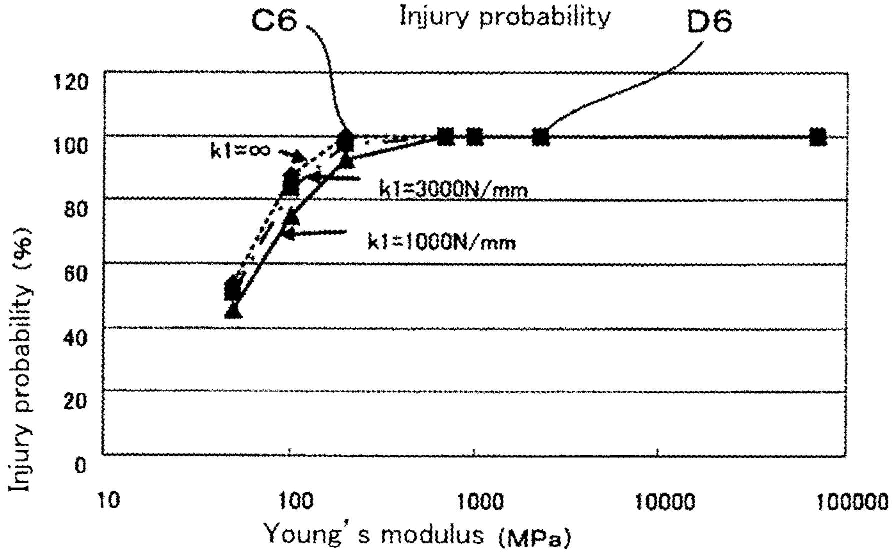
FIG. 36 is an explanatory view illustrating a relationship between the Young's modulus of the material and injury probability when the Young's modulus of the material and the spring constant of the skull are changed.

Results obtained by changing the Young's modulus of the material in the range of from 50 MPa to 70000 MPa are illustrated in FIGS. 35 and 36. In FIG. 35, the HIC is calculated with the Young's modulus of the material plotted on a horizontal axis. In FIG. 36, the injury probability is calculated with the Young's modulus of the material plotted on a horizontal axis.

In FIGS. 35 and 36, C5 and C6 each represent a case where the Young's modulus of the material is 200 MPa, and D5 and D6 each represent a case where the Young's modulus of the material is 2300 MPa (polycarbonate).

FIGS. 35 and 36 reveal that when the Young's modulus of the material is high, the HIC value significantly changes depending on the spring constant (k1) of the skull and that the injury probability reaches 100%. On the other hand, when the Young's modulus of the material is low, the HIC value does not change so much even when the spring constant (k1) of the skull is changed, and as the Young's modulus of the material becomes lower, the injury probability abruptly decreases.

Figure 37:
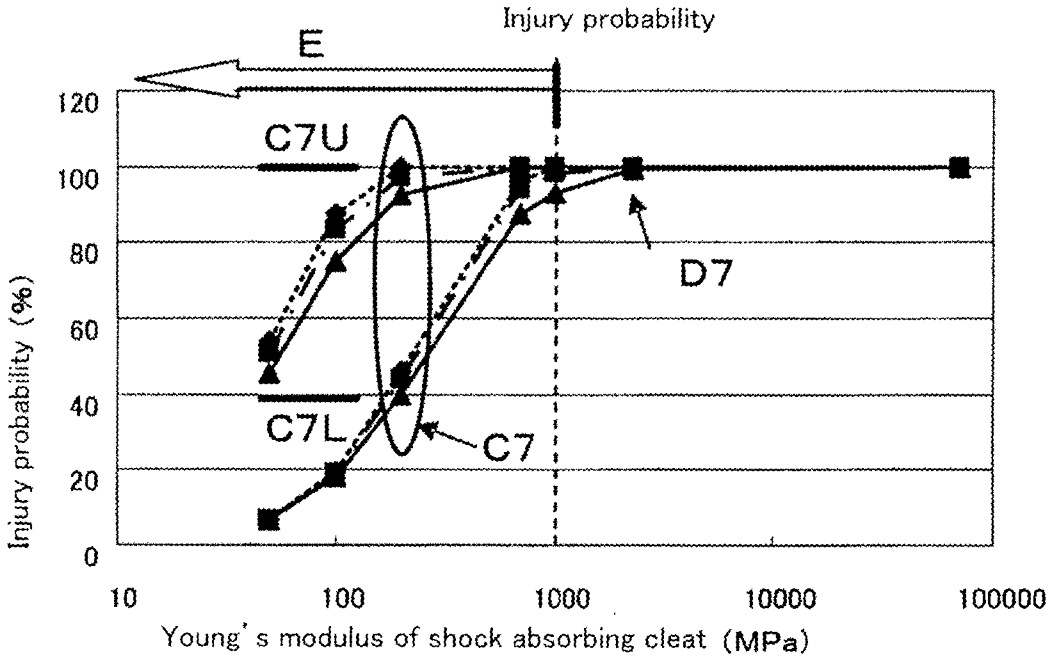
FIG. 37 is an explanatory view in which results illustrated in FIGS. 34 and 36 are combined.

(4-3) Young's Modulus of Material of Shock Absorbing Cleat and Injury Probability In FIG. 37, the results illustrated in FIGS. 34 and 36 are shown in the same graph.

In FIG. 37, C7 represents a case where the Young's modulus of the material is 200 MPa, and D7 represents a case where the Young's modulus of the material is 2300 MPa (polycarbonate).

In the case where the Young's modulus of the material is 200 MPa, when the dimensions of the respective sections of the shock absorbing cleat 5 fall within the range listed in Table 1, the injury probability falls between the upper limit (C7U) and lower limit (C7L) of a part C7 in FIG. 37.

On the other hand, in the case (D7) where the Young's modulus of the material is 2300 MPa (polycarbonate), even when the dimensions of the respective sections of the shock absorbing cleat 5 are of any values within the range listed in Table 1, the injury probability is 100%.

EXAMPLES

The following describes functions and advantages of the escalator step according to the Example 1.

Assumed is a case where a passenger falls down and hits his or head against the corner (section A of FIG. 1) of the step 1 of Example 1.

The shock absorbing cleat 5 is mounted on the corner and, accordingly, the head of the passenger who falls down collides with the shock absorbing cleat 5. In the present embodiment, urethane rubber having lower rigidity than metals, such as aluminum and stainless steel, and the resin, such as polycarbonate used for demarcation, is used for the shock absorbing cleat 5. Thus, the shock absorbing cleat 5 is significantly deformed at the time of head collision to thereby absorb collision energy more than a metal or resin corner portion of a conventional step, thereby allowing the injury probability to be reduced.

Although the injury probability differs depending on the dimension of each section of the shock absorbing cleat 5, it assumes any value between the upper limit (C7U) and lower limit (C7L) of the part C7 of FIG. 37, thereby allowing the injury probability to be reduced as compared at least to the collision with a corner of a conventional metal or plastic step.

Typically, the urethane rubber is more likely to be worn and to get dirty. However, a metal material is used for the body section 6 of the tread 2, including the convex sections 8, which the passengers frequently get on and off. Therefore, the convex sections 8 of the body section 6 have wear or dirtiness not more than the conventional steps. Although the urethane rubber is used for the shock absorbing cleat 5, their lifetimes will not come to the end by getting worn or dirty in a short period of time because passengers do not frequently step their feet on this portion. When the shock absorbing cleat 5 significantly get worn or dirty and their lifetimes come to the end, it is not required to replace the entire tread 2, but required to replace the shock absorbing cleat 5 only. In addition, since a plurality of shock absorbing cleat 5 are mounted in a width direction of the step 1, when only one of them comes to the end of its lifetime, it is required to replace the dead one only. Thus, maintenance costs can be reduced to the requisite minimum.

Although the urethane rubber is used for the shock absorbing cleat 5 in the above description, the material of the shock absorbing cleat 5 is not limited to the urethane rubber and may be an elastomer, such as natural rubber, synthetic rubber, silicone rubber, or fluorocarbon rubber.

Further, a nylon-based, a Teflon®-based, and other resin materials having a low rigidity may be used. That is, as the material for the shock absorbing cleat 5, a polymeric material composed of at least one of the resin and elastomer may be used.

Further, the shock absorbing cleat 5 can also serve as demarcation to clarify an edge of the tread 2 for passengers.

As described above, by using an escalator step according to Example 1, it is possible to provide, at low cost, a safe escalator that can prevent the passenger from suffering a serious injury even when he or she falls down and hits his or her head against a step corner and that does not encourage falling of the passenger even in a normal use state by a simple injection molding of a polymeric material.

Second Example

In the above Example 1, the Young's modulus of the material used for the shock absorbing cleat 5 is set to 200 MPa. Example 2 differs from Example 1 in that the Young's modulus of the material used for the shock absorbing cleat 5 is set to 1000 MPa or less. Since the structure of the shock absorbing cleat 5 is the same as that of Example 1, descriptions about the structure of the shock absorbing cleat 5 according to Example 2 will be omitted.

With reference to FIG. 37, the injury probability in Example 2 will be described. A range of the Young's modulus of the material used for the shock absorbing cleat 5 according to Example 2 is represented by a bold arrow E.

Assumed is a case where the Young's modulus of the material used for the shock absorbing cleat 5 is reduced from 70000 MPa. The injury probability remains completely unchanged when the Young's modulus of the material reaches about 2300 MPa (polycarbonate). When the Young's modulus of the material is further reduced to 1000 MPa or less, the injury probability abruptly decreases, depending on the dimension of the shock absorbing cleat 5.

That is, in a case where the Young's modulus of the material used for the shock absorbing cleat 5 is set to 1000 MPa or less, by adequately determining the dimension of the shock absorbing cleat 5 within the range listed in Table 1, a probability of the serious injury can be reduced as compared to the collision with a corner of a conventional metal or plastic step.

On the other hand, as described above, the shock absorbing cleat 5 should not have such a flexible structure or such a hardness that encourages the passenger to fall down in a normal use state. That is, the cleat needs to have enough hardness so as not to be buckled by a load applied thereto when the passenger stands on the cleat or walk on the cleat. In view of this, there exists a lower limit value that is required from a practical perspective on the Young's modulus of the material used for the shock absorbing cleat 5. The lower limit value is adequately selected with reference to the structure of FIG. 10 and dimensional range listed in Table 1 and is, for example, 20 MP or more, preferably, 50 MPa or more, and more preferably, 100 MPa or more.

Thus, it is possible to provide a safe escalator in which a polymeric material having a Young's modulus of 100 MPa or less is used for the shock absorbing cleat 5 to reduce the probability of a serious injury when the passenger falls down and hits his or her head against the corner of the step, and a polymeric material having a Young's modulus of 20 MPa or more is used to prevent the cleat from being buckled due to a load from the passenger in a normal use state.

Although the preferred embodiments of the present invention have been described above, the embodiments are merely illustrative and do not limit the scope of the present invention.

These embodiments can be practiced in other various forms, and various omissions, substitutions and changes may be made without departing from the scope of the invention. The embodiments and modifications thereof are included in the scope or spirit of the present invention and in the appended claims and their equivalents.

What is claimed is:

1. An escalator step arranged in a escalator comprising:

a tread are formed on the escalator step in a parallel of the escalator traveling direction;

a riser connected to a rear end portion of a body section of the tread and having thereon a plurality of convex sections each of which has an opened upper end and which are arranged in a width direction perpendicular to a traveling direction of the escalator and a plurality of concave sections formed between the adjacent convex sections; and a shock absorbing cleat provided in a notch formed at the body section rear end portion near a corner at which the riser and tread are connected to each other, wherein the shock absorbing cleat includes a plurality of long convex sections which are arranged in parallel and each of which has a rear end surface extending so as to be the same flat surface as the convex section of the riser and a front end surface connected to each of the plurality of convex sections of the tread and a plurality of short convex sections which are arranged in parallel between the adjacent long convex sections and each of which has a rear end surface extending so as to be the same flat surface as the concave section of the riser and a front end surface connected to each of the plurality of convex sections of the tread, a length of each of the long convex sections of the shock absorbing cleat is set to 20 mm to 50 mm, a length of each of the short convex sections is set to 14 mm to 44 mm, a thickness of each of the long and short convex sections is set to 2 mm to 4 mm, an interval between the long and short convex sections is set to 5 mm to 7 mm, a height of each of the long and short convex sections is set to 10 mm to 15 mm, and the shock absorbing cleat is formed of a material having a Young's modulus of not less than 20 MPa and not more than 1000 MPa.

2. The escalator step according to claim 1, wherein the polymeric material is resin or elastomer.

3. The escalator step according to claim 2, wherein the elastomer is urethane rubber, natural rubber, synthetic rubber, silicone rubber, or fluorocarbon rubber.

4. The escalator step according to claim 3, wherein the shock absorbing cleat also serves as demarcation.

5. The escalator step according to claim 1, wherein the shock absorbing cleat is arranged in plural number in the width direction of the tread.

6. The escalator step according to claim 1, wherein the shock absorbing cleat further has a base section which is provided at bottoms of the long convex sections and short convex sections and which has, at a back side of the base section, a hollow section and a protruding section which plugs the opened upper end of each convex section of the riser.

7. The escalator step according to claim 6, wherein the polymeric material is resin or elastomer.

8. The escalator step according to claim 7, wherein the elastomer is urethane rubber, natural rubber, synthetic rubber, silicone rubber, or fluorocarbon rubber.

9. The escalator step according to claim 8, wherein the shock absorbing cleat also serves as demarcation.

10. The escalator step according to claim 6, wherein the shock absorbing cleat is arranged in plural number in the width direction of the tread.

11. An escalator comprising:

an escalator step arranged in the escalator;

a tread formed on the escalator step in a parallel of the escalator traveling direction;

a riser connected to a rear end portion of a body section of the tread and having thereon a plurality of convex sections arranged in a width direction perpendicular to a traveling direction of the escalator and a plurality of concave sections formed between the adjacent convex sections; and a shock absorbing cleat provided in a notch formed at the body section rear end portion near a corner at which the riser and tread are connected to each other, wherein the shock absorbing cleat includes a plurality of long convex sections which are arranged in parallel and each of which has a rear end surface extending so as to be the same flat surface as the convex section of the riser and a front end surface connected to each of the plurality of convex sections of the tread and a plurality of short convex sections which are arranged in parallel between the adjacent long convex sections and each of which has a rear end surface extending so as to be the same flat surface as the concave section of the riser and a front end surface connected to each of the plurality of convex sections of the tread, a length of each of the long convex sections of the shock absorbing cleat is set to 20 mm to 50 mm, a length of each of the short convex sections is set to 14 mm to 44 mm, a thickness of each of the long and short convex sections is set to 2 mm to 4 mm, an interval between the long and short convex sections is set to 5 mm to 7 mm, a height of each of the long and short convex sections is set to 10 mm to 15 mm, and the shock absorbing cleat being formed of a polymeric material having a Young's modulus of 1000 MPa or less.

* * * * *